US012739043B2

(12) United States Patent
Haghighat et al.

(10) Patent No.: US 12,739,043 B2
(45) Date of Patent: Sep. 15, 2026

(54) METHODS, ARCHITECTURES, APPARATUSES AND SYSTEMS FOR BEAM MANAGEMENT OF INTELLIGENT REFLECTING SURFACES

(71) Applicant: InterDigital Patent Holdings, Inc., Wilmington, DE (US)

(72) Inventors: Afshin Haghighat, Ile-Bizard (CA); Young Woo Kwak, Woodbury, NY (US); Paul Marinier, Brossard (CA); Loic Canonne-Velasquez, Dorval (CA); Moon-il Lee, Melville, NY (US); Jonghyun Park, Syosset, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 195 days.

(21) Appl. No.: 18/577,344

(22) PCT Filed: Jul. 11, 2022

(86) PCT No.: PCT/US2022/036679
§ 371 (c)(1),
(2) Date: Jan. 8, 2024

(87) PCT Pub. No.: WO2023/283485
PCT Pub. Date: Jan. 12, 2023

(65) Prior Publication Data

US 2024/0388326 A1 Nov. 21, 2024

Related U.S. Application Data

(60) Provisional application No. 63/330,416, filed on Apr. 13, 2022, provisional application No. 63/228,873, (Continued)

(51) Int. Cl.
*H04B 17/318* (2015.01)
*H04B 7/04* (2017.01)
(Continued)

(52) U.S. Cl.
CPC ....... *H04B 17/328* (2023.05); *H04B 7/04013* (2023.05); *H04B 7/0632* (2013.01); *H04L 5/0048* (2013.01); *H04W 24/10* (2013.01)

(58) Field of Classification Search
CPC ............ H04B 17/328; H04W 7/04013; H04W 7/0632; H04W 24/10; H04L 5/0048
See application file for complete search history.

(56) References Cited

U.S. PATENT DOCUMENTS

| | | | | |
|---|---|---|---|---|
| 2014/0314167 | A1* | 10/2014 | Jeong | H04B 7/0626 375/267 |
| 2017/0134964 | A1* | 5/2017 | Yu | H04L 5/0055 |
| 2022/0271805 | A1* | 8/2022 | Gao | H04L 5/0048 |

OTHER PUBLICATIONS

3rd Generation Partnership Project; Technical Specification Group Radio Access Network; NR; Physical layer procedures for data (Release 16), 3GPP TS 38.214 V16.6.0 (Jun. 2021), 82 pages.

* cited by examiner

*Primary Examiner* — Brenda H Pham
(74) *Attorney, Agent, or Firm* — Jamie T. Nguyen

(57) ABSTRACT

Procedures, methods, architectures, apparatuses, systems, devices, and computer program products are disclosed that may be implemented in a wireless transmit/receive unit (WTRU) that is in communication with a base station and/or an intelligent reflecting surface (IRS). For example, the WTRU may operate to facilitate selection of a first beam transmitted from the base station and reflected by the IRS and selection of a reflection parameter set which configures the IRS to reflect the first beam in a manner which may enhance reception of the first beam at the WTRU. As another example, the WTRU may operate to facilitate selection of a beam pair which may include a first beam transmitted from the base station and a second beam transmitted from the base station and reflected by the IRS to the WTRU. The WTRU
(Continued)

may receive a configuration which associates particular beams with particular reference signal resources.

20 Claims, 10 Drawing Sheets

Related U.S. Application Data filed on Aug. 3, 2021, provisional application No. 63/219,952, filed on Jul. 9, 2021.

(51) Int. Cl.

| | |
|---|---|
| ***H04B 7/06*** | (2006.01) |
| ***H04L 5/00*** | (2006.01) |
| ***H04W 24/10*** | (2009.01) |

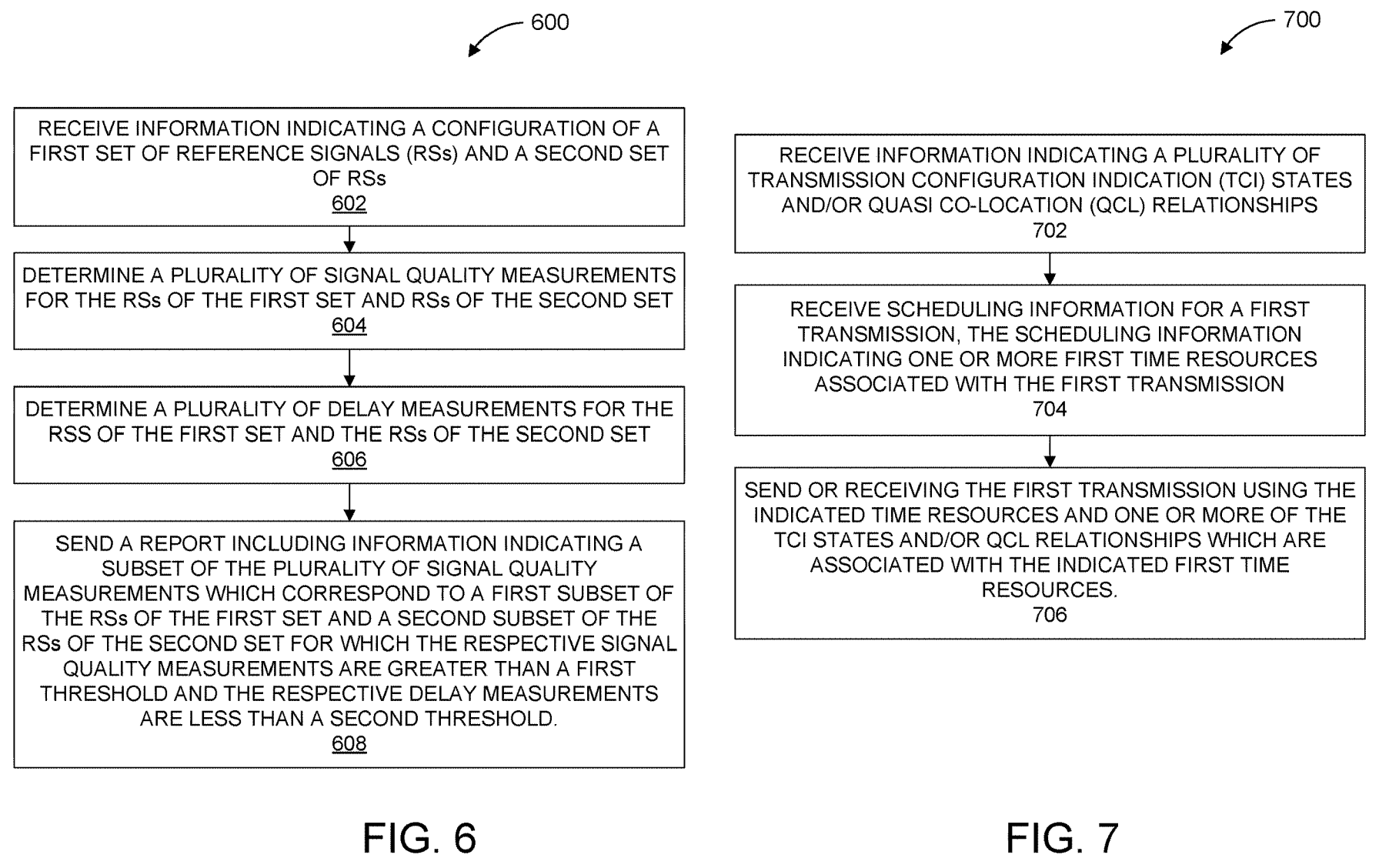

600

RECEIVE INFORMATION INDICATING A CONFIGURATION OF A FIRST SET OF REFERENCE SIGNALS (RSs) AND A SECOND SET OF RSs
602

DETERMINE A PLURALITY OF SIGNAL QUALITY MEASUREMENTS FOR THE RSs OF THE FIRST SET AND RSs OF THE SECOND SET
604

DETERMINE A PLURALITY OF DELAY MEASUREMENTS FOR THE RSS OF THE FIRST SET AND THE RSs OF THE SECOND SET
606

SEND A REPORT INCLUDING INFORMATION INDICATING A SUBSET OF THE PLURALITY OF SIGNAL QUALITY MEASUREMENTS WHICH CORRESPOND TO A FIRST SUBSET OF THE RSs OF THE FIRST SET AND A SECOND SUBSET OF THE RSs OF THE SECOND SET FOR WHICH THE RESPECTIVE SIGNAL QUALITY MEASUREMENTS ARE GREATER THAN A FIRST THRESHOLD AND THE RESPECTIVE DELAY MEASUREMENTS ARE LESS THAN A SECOND THRESHOLD.
608

RECEIVE INFORMATION INDICATING A PLURALITY OF TRANSMISSION CONFIGURATION INDICATION (TCI) STATES AND/OR QUASI CO-LOCATION (QCL) RELATIONSHIPS
702

RECEIVE SCHEDULING INFORMATION FOR A FIRST TRANSMISSION, THE SCHEDULING INFORMATION INDICATING ONE OR MORE FIRST TIME RESOURCES ASSOCIATED WITH THE FIRST TRANSMISSION
704

SEND OR RECEIVING THE FIRST TRANSMISSION USING THE INDICATED TIME RESOURCES AND ONE OR MORE OF THE TCI STATES AND/OR QCL RELATIONSHIPS WHICH ARE ASSOCIATED WITH THE INDICATED FIRST TIME RESOURCES.
706

FIG. 7

METHODS, ARCHITECTURES, APPARATUSES AND SYSTEMS FOR BEAM MANAGEMENT OF INTELLIGENT REFLECTING SURFACES

CROSS-REFERENCE TO RELATED APPLICATIONS

This application is a U.S. National Stage Application under 35 U.S.C. § 371 of International Patent Application No. PCT/US2022/036679, filed Jul. 11, 2022, which claims the benefit of U.S. Provisional Application Nos. (i) 63/219,952 filed 09-Jul.-2021, (ii) 63/228,873 filed 03-Aug.-2021, and (iii) 63/330,416 filed 13-Apr.-2022; each of which is incorporated herein by reference.

BACKGROUND

The present disclosure is generally directed to the fields of communications, software and encoding, including, for example, to methods, architectures, apparatuses, systems directed to the fields of communications, software and encoding, including, for example, to methods, architectures, apparatuses, systems directed to wireless communications using intelligent reflecting surfaces (IRSs) and reconfigurable intelligent surfaces (RISs).

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein:

FIG. 6 is a flow diagram illustrating a representative beam management procedure which may be implemented by a WTRU;

FIG. 7 is a flow diagram illustrating a representative transmission configuration indication (TCI) state and/or quasi co-located (QCL) relationship determination procedure which may be implemented by a WTRU;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
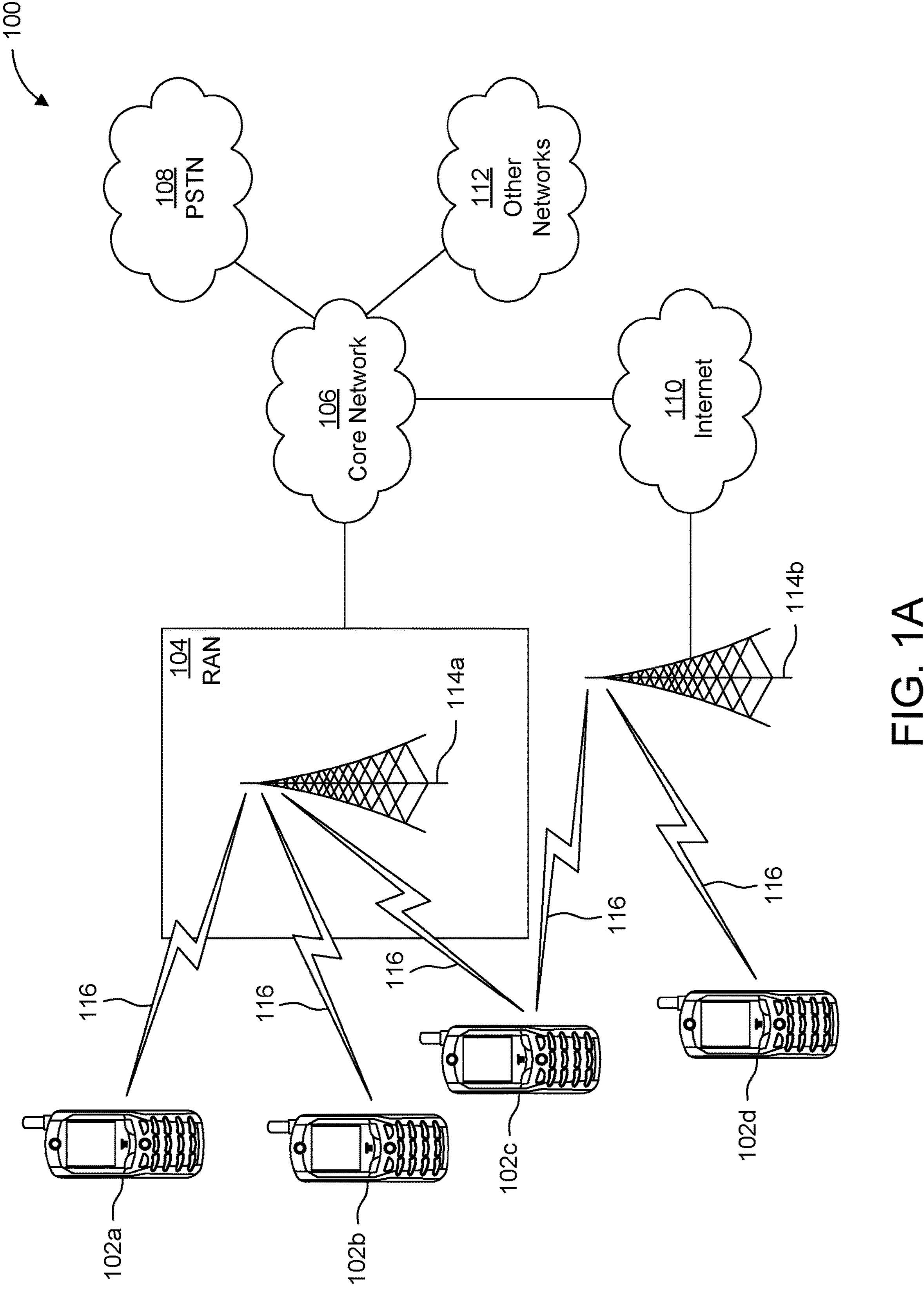
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*,

102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
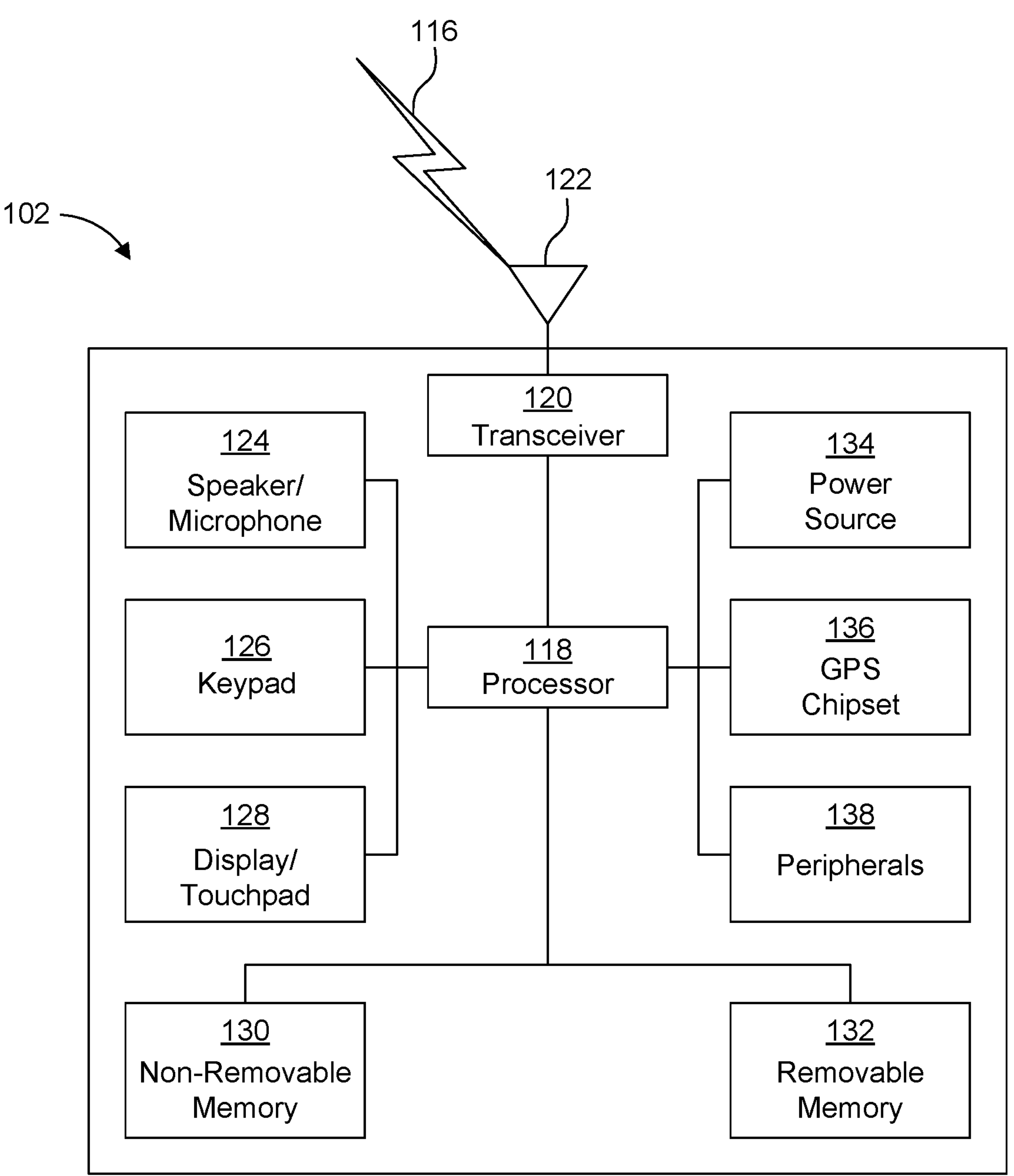
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
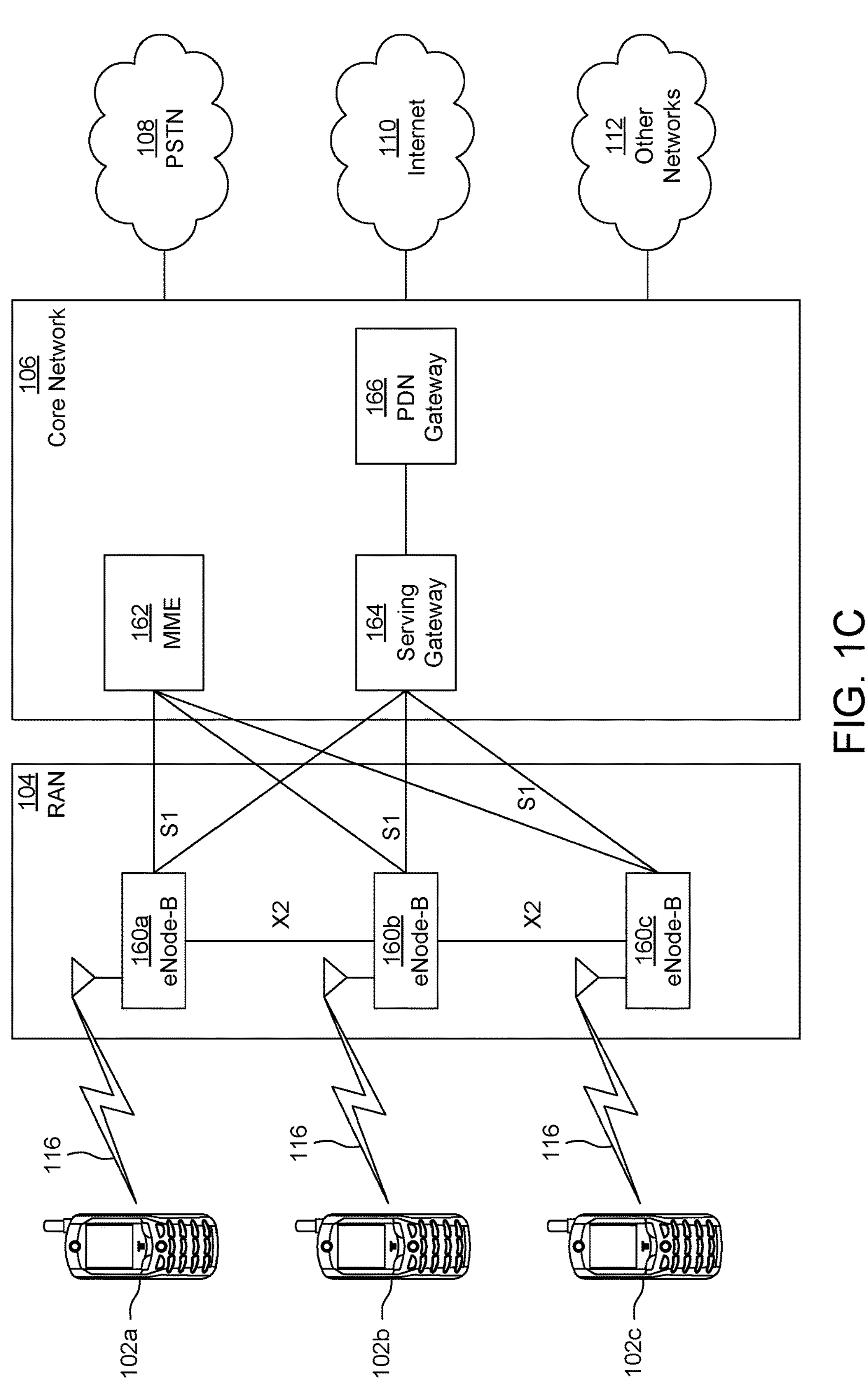
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the SI interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
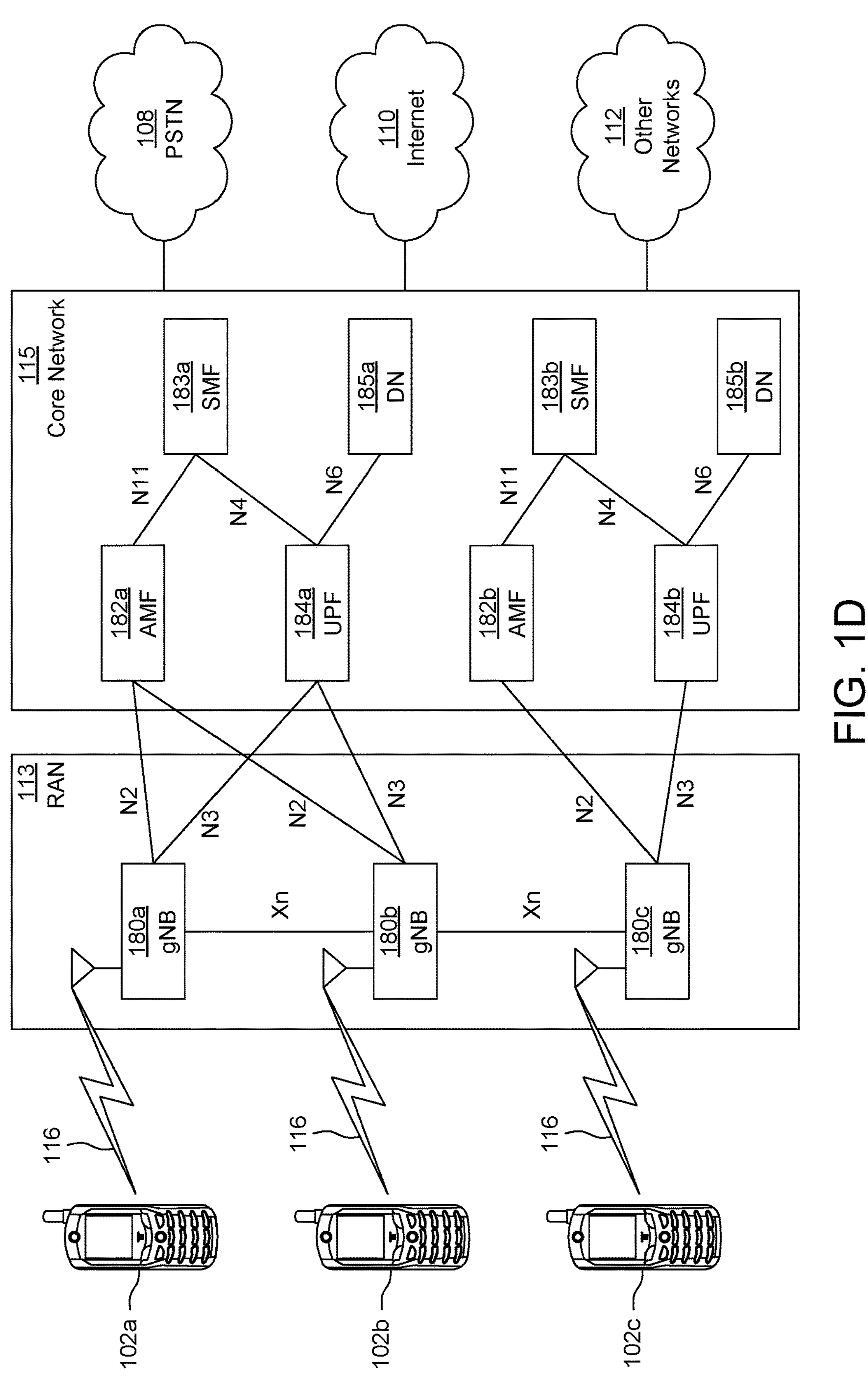
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

A reconfigurable intelligent surface (RIS) may refer to a reflecting surface that has one or more reflection properties which may be changed and/or reconfigured. A RIS may also be referred to as an Intelligent Reflecting Surface (IRS). Herein, the terms RIS and IRS may be used interchangeably. For example, a Reconfigurable Intelligent Surface (RIS) may comprise a plurality of programmable sub-wavelength sized unit cells that may be placed in relatively close proximity of each other. The relatively small size of the unit cells may cause each unit cell to behave like a scatterer. In an RIS platform, by separate tuning of the unit cells, the properties of an incident wave may be controlled (e.g., to enhance the signal quality at a receiver). In examples where the unit cells have a sub-wavelength size, a large number of unit cells may configure the RIS such as to better control the phase of a reflected wave and/or ensure coherent alignment with a desired channel.

A pattern of applied phase-shifts to the unit cells of the RIS may greatly influence a received signal energy at the receiver. It may be essential that the unit cells are optimized properly and efficiently to support the reliability of a wireless communication link.

Figure 2:
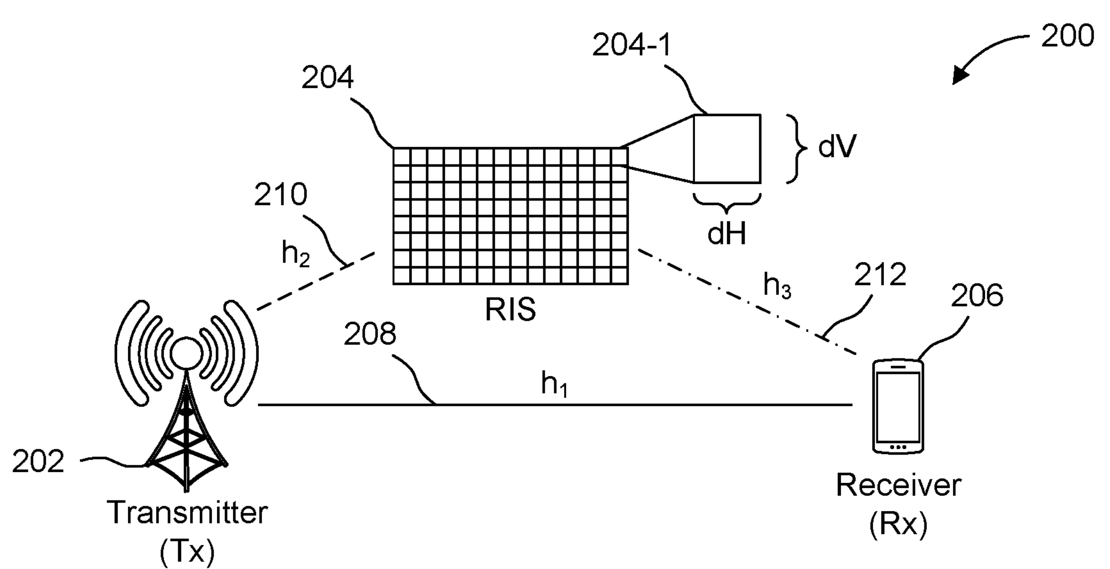
FIG. 2 is a system diagram illustrating a representative example of a reconfigurable intelligent surface (RIS) relative to a transmitter and a receiver.

FIG. 2 is a system diagram illustrating a representative example 200 of a reconfigurable intelligent surface (RIS) 204 relative to a transmitter 202 (e.g., a base station such as a gNB 180) and a receiver 206 (e.g., a WTRU 102).

As shown in FIG. 2, a transmitter (e.g., RAN 104/113) 202 may communicate with a receiver (e.g., WTRU 102) 206 via a direct path corresponding to a channel $h_1$ 208. The transmitter 202 may also communicate with the receiver 206 via an indirect path using the RIS 204 corresponding to channels $h_2$ 210 and $h_3$ 212. the structure of a RIS 204 may be composed of $N_H$ unit cells 204-1 per row and $N_V$ unit cells 204-1 per column where $N=N_H \times N_V$. It may be assumed that each unit cell 204-1 has an area $A_n=d_H \times d_V$, where $d_V$ and $d_V$ are the width and the height of the respective unit cell 204-1. All the unit cells 204-1 may be placed almost edge-to-edge on a rectangular grid, therefore a total area of the RIS 204 may be approximated as $N \times A_n$. All the unit cells 204-1 may be indexed row-by-row by index n, where $n \in [1, N]$.

For example, a reflection property of each unit cell 204-1 may be represented as $\Gamma_n=\Gamma e^{\Phi_n}$, where $\Gamma \in \{0,1\}$ and $\phi_n$ are the amplitude and phase of the reflection factor of a unit cell, respectively. It should be appreciated that full reflection and full absorption scenarios correspond to $\Gamma=1$ for $\Gamma=0$, respectively. For example, a phase property of each unit cell 204-1 can be assumed to be selectable from the set of $2^k$ values uniformly distributed over the interval of $[0, 2\pi]$.

In certain representative embodiments, a RIS 204 may be configured with at least one set of reflection parameters, where each set contains information (e.g., all information) related to configuring the reflection characteristics, such as phase and reflection coefficients. For example, a set of reflection parameters may configure the unit cells 204-1 of the RIS 204 to achieve specific reflection characteristics.

Figure 3:
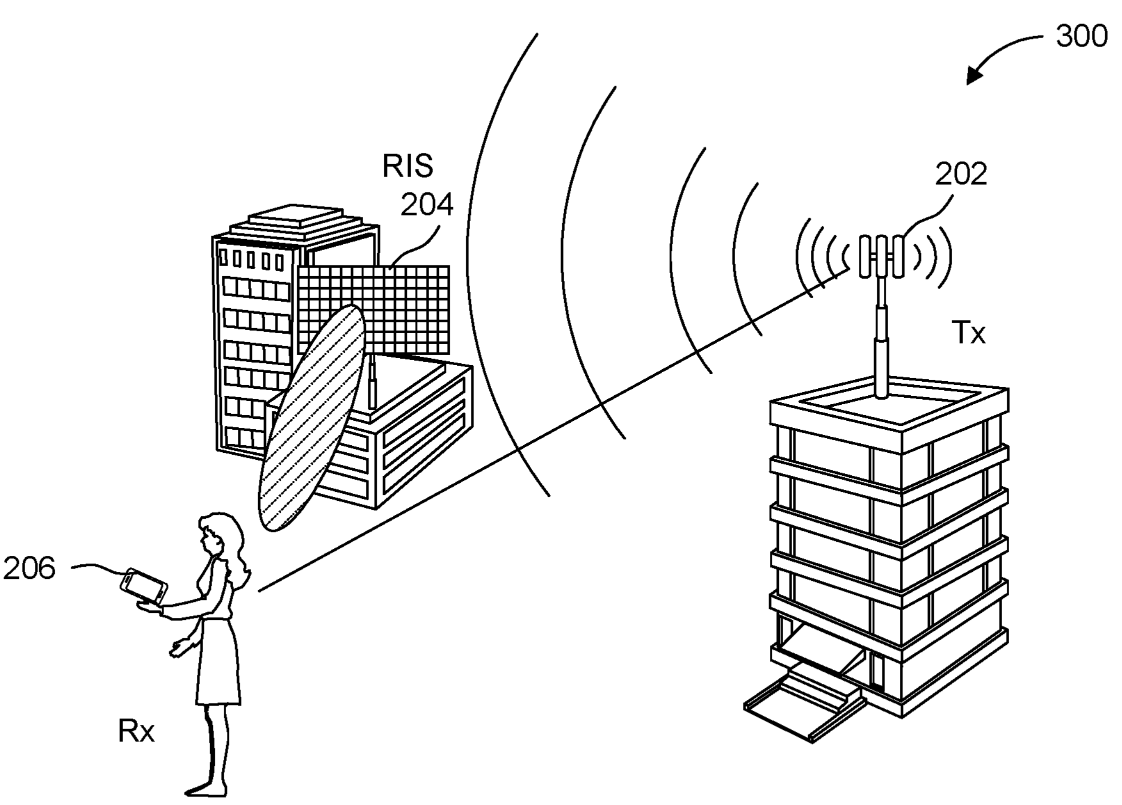
FIG. 3 is a system diagram illustrating a representative example of a use case of a RIS.

FIG. 3 is a system diagram illustrating a representative example of a use case of a RIS 204. In the system 300 of FIG. 3, manipulating the impinging electromagnetic signals at the RIS 204 may enhance the reliability of a wireless channel and may benefit an intended receiver 206. As shown in FIG. 3, to improve reliability of the wireless communication link, the RIS (e.g., a rectangular RIS) 204 may be configured with N electrically controlled unit cells 204-1 that may be positioned to assist reception by controlled reflection of a transmitted signal from a transmitter 202 towards a receiver 206.

IRSs may have different types of functionality such as Passive Reception-Passive Reflection (PRPR), Active Reception-Passive Reflection (ARPR) Passive Reception-Active Reflection, and Active Reception-Active Reflection (ARAR).

For example, a PRPR IRS may have no receive or transmit processing capabilities and/or may receive control information from a backhaul-like connection for the purpose of controlling reflection parameters and properties of IRS.

For example, a ARPR IRS may have some level of reception capabilities, such as for the purpose of controlling reflection parameters and properties of the IRS, but may be considered passive from a reflection perspective.

For example, a PRAR IRS may have no receive processing capability, but it may have some transmit processing capability. The PRAR IRS may receive control information from a backhaul-like connection for the purpose of controlling reflection parameters and properties of IRS. A reflected signal may be filtered, amplified, etc. by the PRAR IRS. Further, the PRAR IRS may be configured to enhance the reflected signal by inserting an additional signal, e.g., a reference signal.

For example, a ARAR IRS may have some level of active recepection capabilities. The ARAR IRS may have active reception capability for the purpose of controlling reflection parameters and properties of the IRS. According to its transmit processing capability, a reflected signal may be filtered, amplified, etc. by the ARAR IRS. Further, the ARAR IRS may be configured to enhance the reflected signal by inserting an additional signal, e.g., a reference signal.

As described herein, an IRS may refer to any of a PRPR, ARPR, PRAR or ARAR IRS as may be understood by those skilled in the art.

In a system using a RIS 204 (e.g., a RIS-based system), beam management (BM) procedures may require to consider the additional beam(s) which may be caused by the RIS 204. A BM procedure may be performed in multiple steps or modes, and such procedures may require additional consideration and/or enhancements.

As will be described below, methods, systems and apparatus may be directed to RIS modes and mode determination procedures, beam selection procedures, TCI and/or QCL indications and procedures, CSI-RS transmission modes and transmission procedures, and/or association of measurement and reporting.

In certain representative embodiments, a RIS may be configured with at least one set of reflection parameters, where each set contains information (e.g., all information) related to configuring the reflection characteristics, such as phase and reflection coefficients. For example, a set of reflection parameters may configure the unit cells 204-1 of the RIS 204 to achieve specific reflection characteristics.

Overview

RIS Mode Determination

A RIS 204 may be configured with at least one reflection parameter set. A reflection parameter set may include parameters (e.g., all information) related to (e.g., to control) a reflection characteristics configuration, such as phase and reflection coefficients. Each reflection parameter set may be associated with an ID that may be communicated between the RIS, a base station (e.g., a gNB 180) and a WTRU 102. Each configuration may also be associated with at least one spatial filter characteristic or reflection pattern. The at least one spatial filter characteristic may be defined per predefined and/or configured reference signals (e.g., that may be known to at least one of the gNB 180 or WTRU 102). For example, there may be a one-to-one association between a reflection parameter set and a reflection pattern of a RIS 204.

In certain representative embodiments, one or more RIS modes may be used by a RIS 204. A RIS mode may determine beam reflection characteristics in a cell. As used herein, RIS mode may be used interchangeably with beam set, reflection mode, reflection set, reflection parameter set, reflection configuration, RIS configuration, RIS configuration set, and/or RIS set. For example, a RIS mode may determine beam reflection characteristics for a plurality RISs in a cell.

In certain representative embodiments, a beam reflection characteristic may include at least one of no reflection, beam reflection direction, beam reflection angle, and/or beam reflection strength.

In certain representative embodiments, a beam (e.g., a received (Rx) beam) may be determined based on a beam reference signal and a RIS mode (e.g., a configured or active RIS mode). For example, a beam reference signal may be indicated as a certain type (e.g., QCL type-D for a downlink signal reception or an uplink signal transmission for a WTRU 102) and the WTRU 102 may determine a Rx beam or a Tx beam based on the beam reference signal indicated and an associated RIS mode.

In certain representative embodiments, a RIS mode may be determined based on one or more of the following: (1) a dynamic indication, (2) a higher layer configuration, and/or (3) a system parameter.

For example, the RIS mode may be determined based (e.g., in part) on a dynamic indication may be a DCI. In an example, when a WTRU 102 is scheduled (e.g., by DCI) for a PDSCH reception, a RIS mode may be indicated as well as a TCI state for the PDSCH reception. The WTRU 102 may determine a Rx beam based on the indicated information, such as the TCI state and/or the RIS mode. A determined Rx beam may be different for a same TCI state if the associated RIS mode is different. In certain representative embodiments, an explicit bit field for a RIS mode indication may be included in the scheduling DCI. In certain representative embodiments, an RNTI scrambled on the CRC of the scheduling DCI may be determined based on the RIS mode. For example, a C-RNTI for the scheduling DCI may be determined based on the RIS mode. In certain representative embodiments, a common DCI may be transmitted to indicate a RIS mode for a time window which may be a number of frames, sub-frames, slots, mini-slots, symbols and/or milliseconds.

For example, the RIS mode may be determined based (e.g., in part) on a higher layer configuration. In an example, received or indicated information (e.g., a RRC/MAC-CE) may be used to configure a RIS mode for a specific time and/or frequency resources. The time and/or frequency resources may be any of frames, sub-frames, slots, mini-slots, symbols, milliseconds, carriers, subcarriers, BWPs and/or reference signals. In certain representative embodiments, a TCI state may have or include an associated RIS mode.

For example, the RIS mode may be determined based (e.g., in part) on a system parameter. In certain representative embodiments, the system parameter may be a slot index, a radio frame index, a SFN number, a BWP-id. In an example, the RIS mode may be predetermined or preconfigured on a time basis, such as a per slot basis. A first subset of slots may be associated with a first RIS mode. A second subset of slots may be associated with a second RIS mode which may be different than the first RIS mode.

In certain representative embodiments, the use (e.g., activation) of a RIS mode may be determined based on one or more of following: (1) signal strength, (2) line of sight, and/or (3) location information.

For example, the usage of a RIS mode may be determined based (e.g., in part) on signal strength (e.g., of a beam pair link). As one example, L1-RSRP (and/or L1-SINR and/or RSRQ and/or SINR) of a beam pair link may be used to determine a RIS mode. On condition the measured signal strength (e.g., L1-RSRP of a best beam pair link) is higher than a threshold, the WTRU 102 may not use a RIS mode.

For example, the usage of a RIS mode may be determined based (e.g., in part) on the existence of a line of sight between a transmitter (e.g., base station, gNB 180) and a receiver (e.g., WTRU 102).

For example, the usage of a RIS mode may be determined based (e.g., in part) on location information. As one example, the use of a RIS mode may be based on the proximity to a RIS location. For example, on condition that a WTRU 102 is closer to a RIS 204 than a threshold, the WTRU 102 may use RIS mode. The proximity may be determined based on a relative distance between the WTRU 102 and the RIS. Location and/or positioning information of one or more RISs associated with the gNB 180 may be broadcast (e.g., by the gNB 180 or a RIS 204)

Beam Selection Modes

In certain representative embodiments, a communication system may be described as having only one IRS. However, it should be understood by those skilled in the art that a plurality of IRSs may be deployed, implemented or otherwise provided in a communication system. Different modes of beam pairing may be considered where each mode may be selected and used based on system parameters and/or conditions. For example, a mode of beam pairing may be based (e.g., in part) on any of a IRS capability, a gNB capability, a WTRU capability, a traffic type, a traffic distribution, and/or a mobility state of WTRU(s) 102.

Figure 4A:
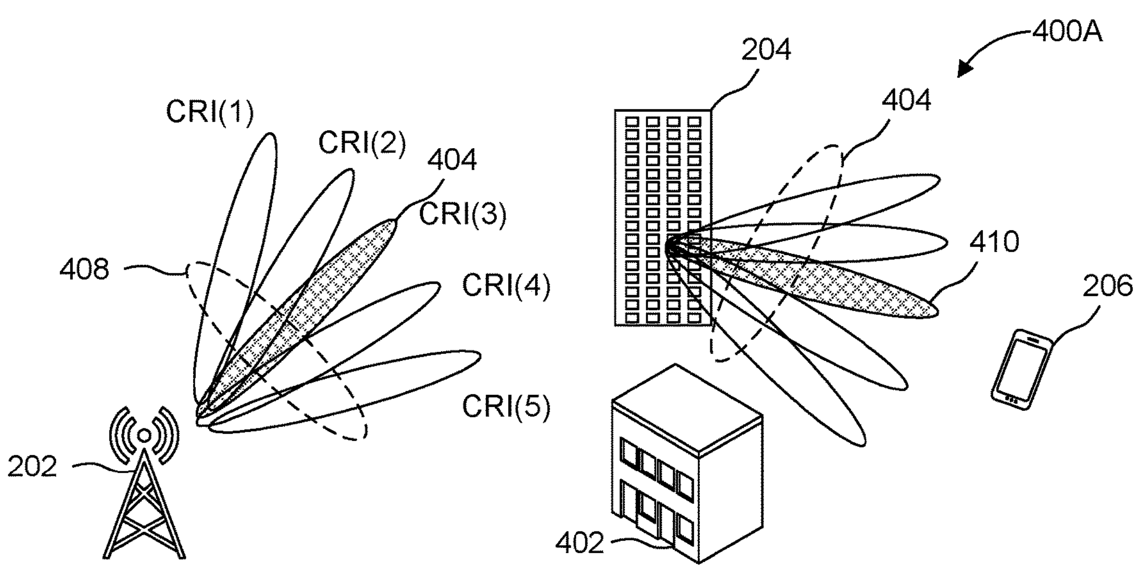
FIG. 4A is a system diagram illustrating a representative example of a beam management procedure in a first mode (e.g., Mode (a))
Figure 4B:
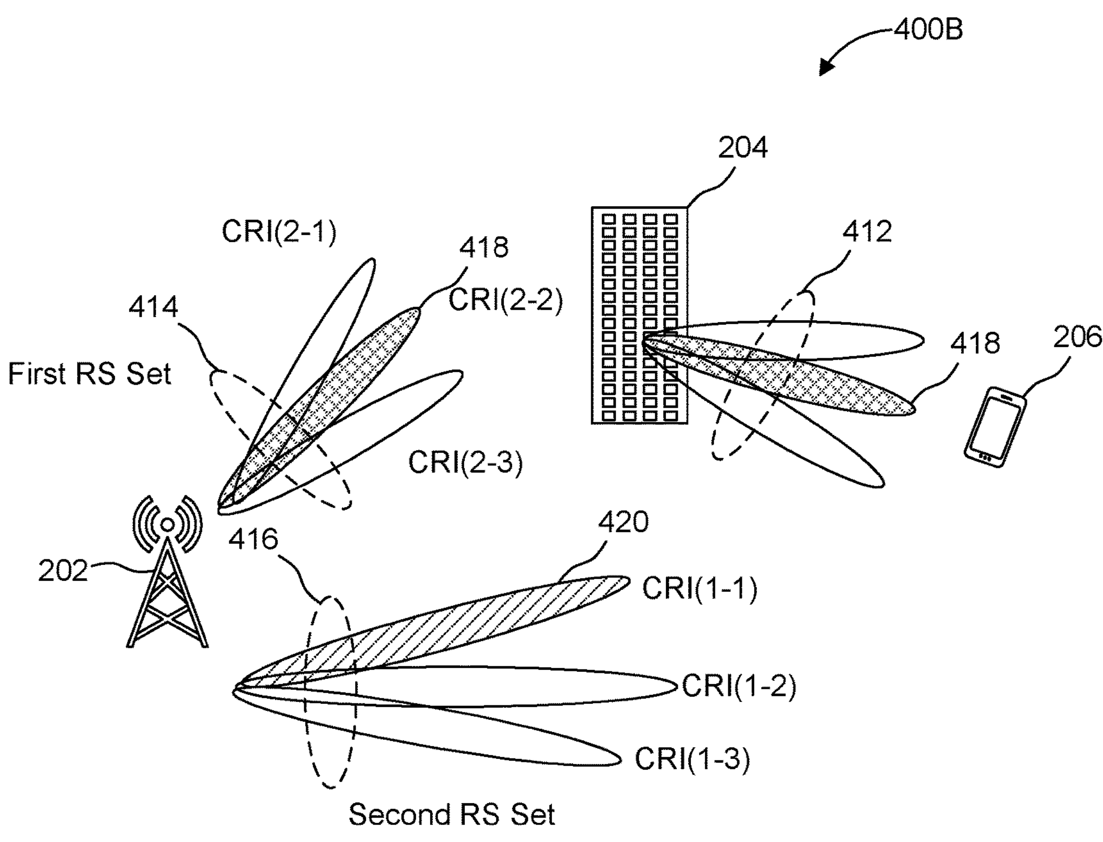
FIG. 4B is a system diagram illustrating a representative example of a beam management procedure in a second mode (e.g., Mode (b))

FIG. 4A is a system diagram illustrating a representative example of a beam management procedure 400A in a first mode (e.g., Mode (a)). FIG. 4B is a system diagram illustrating a representative example of a beam management procedure 400B in a second mode (e.g., Mode (b));

Beam Selection Mode (a)

As shown in FIG. 4A, an obstruction 402, such as a building, may interfere with line of sight transmission between the transmitter 202 and the receiver 206 (e.g., WTRU 102). The IRS 204 may be positioned to provide one or more reflected beams 404 to the receiver 206. In certain representative embodiments, beam selection in Mode (a) may be performed by operations which include at least the selection of a (e.g., best) gNB beam 406 from one or more beams 408 and then the selection of a (e.g., best) IRS reflection 410 of the selected gNB beam 404. For example, the beam selection in Mode (a) may be implemented as two steps of coarse and fine beam selection. For each step, a WTRU 102 may receive a different measurement configuration. As shown in FIG. 4A, beams and/or reference signals transmitted by the gNB 180 may be identified by respective CRIs, such as in the case where the reference signals are CSI-RS. It should be understood by those skilled in the art that the beams and/or reference signals transmitted by the gNB 180 and/or reflected by the IRS may be identified by other indices (e.g., SSBRI) such as when signals other than CSI-RS are transmitted.

For example, a WTRU 102 may receive more than one CSI configuration set for beam management, where a first CSI configuration set may be used for gNB to IRS beam selection (e.g., coarse selection), and a second (e.g., different) CSI configuration set may be used for IRS to WTRU beam selection (e.g., fine selection).

As another example, a WTRU 102 may assume that a first reflection parameter is set applied to the IRS during the first step and a second (e.g., different) reflection parameter is set applied to the IRS during the second step. For example, for the first step, the IRS parameter set may be chosen (e.g., activated at the IRS) in such a way that the configured reflection characteristics cause a particular reflected beam. A wider reflected beam may assist in the selection of a specific (e.g., best) gNB to IRS beam. For the second step, a WTRU 102 may assume that IRS parameters set that is chosen (e.g., activated at the IRS) in such a way that the configured reflection characteristics cause a particular reflected beam that is different than in the first step (e.g., a narrower reflected beam).

In certain representative embodiments, a gNB 180 may produce (e.g., be capable of producing) a total L of beams. During the beam management procedure, such as for the beam selection between gNB 180 and RIS 204, the gNB 180 may only generate K beams out of the total L beams. For example, the WTRU 102 may receive information about the L and K values via an implicit or explicit indication. For each IRS parameter set to be applied during the BM procedure, the WTRU 102 may receive additional information, such as potential relative angle of arrival, order of beams during sweeping, beamwidth, and/or power, which is associated with the respective IRS parameter set.

A WTRU 102 may receive the information about the L and K values directly through semi-static and/or dynamic signaling. For example, the WTRU 102 may receive the information by a bitmap having a length of L bits, where each value (e.g., "1") at a bit location may represent one of the K available beams. As another example, a WTRU 102 may receive information indicating the L and K values.

A WTRU 102 may determine the K value based on another parameter or configuration. For example, a WTRU 102 may determine the K value based on a received CSI configuration (e.g., CSI for beam management). For example, a WTRU 102 may determine the K value based on one or more of the parameters in a CSI resource setting and/or CSI report setting of an overall CSI configuration.

In each step, the IRS may be configured with at least N (N≥1) sets of reflection parameter sets, where each reflection parameter set contains the information (e.g., all information) related to configuring a set of reflection characteristics such as phase and reflection coefficients. For example, M (M≥1) sets of configured reflection parameter set may be activated (e.g., where M is less than N).

A WTRU 102 may receive information about the N and M values using an implicit or explicit indication. For each received set of N and M values, the WTRU 102 may also receive additional information, such as potential relative angle of arrival, order of beams during sweeping, beamwidth, and/or power, which is associated with the respective IRS parameter set.

A WTRU 102 may receive the information about the N and M values directly through semi-static and/or dynamic signaling. For example, the WTRU 102 may receive the information by a bitmap having a length of N bits, where each value (e.g., "1") at a bit location may represent one of the M activated IRS reflection sets. As another example, a WTRU 102 may receive information indicating the N and M values.

A WTRU 102 may determine the M value based on another parameter and/or configuration. For example, a WTRU 102 may determine the value of M based on a received CSI configuration (e.g., CSI for beam management). For example, a WTRU 102 may determine the M value based on one or more of parameters in a CSI resource setting and/or a CSI report setting of an overall CSI configuration.

In certain representative embodiments, the BM procedure in Mode (a) may include a first step in which beam selection is performed for gNB to IRS transmission (e.g., of multiple beams such as the K beams) and a second step in which reflected beam selection is performed for IRS to WTRU transmission (e.g., of multiple reflected beams such as may be generated by using and/or activating the M IRS reflection sets).

Beam Selection for gNB to IRS Transmission

In certain representative embodiments, a WTRU 102 may be configured with a set of reference signals (e.g., semi-static configuration). For example, the WTRU 102 may receive a first dynamic indication to activate one or more subsets of the set of reference signals for beam selection. The WTRU 102 may receive a second dynamic indication to select a subset from the activated set reference signals. In the first step, the WTRU 102 may assume that, using a configured referenced signal, the gNB 180 performs K transmissions by using each one of K available beams while a IRS reflection parameter set is fixed at a default or an initial setting at the IRS. The K transmissions may be performed by the gNB 180 sequentially using a same or different resources, or simultaneously using different resources. In the first step, the gNB 180 may select the best beam or may receive a selection of the best beam from the WTRU 102.

For example, the best beam may be selected based on one or more of the following feedbacks: (1) IRS feedback and/or (2) WTRU feedback.

As an example, the IRS may perform some measurements such as signal strength (e.g., RSRP), and then the IRS may indicate a preferred beam by reporting one or more corresponding indices (e.g., RS indices) to the gNB 180 (e.g., CRI, SSBRI, SRI, SRS resource set, panel index, etc.) using a backhaul connection, such as an X2 connection.

As another example, the WTRU 102 may be configured with one or more uplink resources for reporting the preferred beam. The uplink resources may include any of uplink channel resources and/or reference signal resources (e.g., PUCCH, PUSCH and/or SRS). A WTRU 102 may perform signal strength measurements (e.g., RSRP or the like) and may indicate one or more preferred beams by reporting one or more corresponding indices (e.g., RS indices) to the gNB 180 (e.g., CRI, SSBRI, SRI, SRS resource set, panel index, etc.) such as by using a preconfigured uplink resource. For example, the indices may be directly reported in an uplink (e.g., PUCCH, PUSCH) payload and/or may be indirectly reported by an association with a resource (e.g., PUCCH, SRS).

For example, to reduce WTRU power consumption, reduce interference, and/or increase resource usage in a cell, one or more such indices (e.g., best or preferred gNB to IRS beam indices) may be reported from the WTRU 102 with a lower transmission power to the IRS which may then be communicated (e.g., forwarded) to the gNB 180 through a backhaul connection.

For example, one or more such indices (e.g., best or preferred gNB to IRS beam indices) may be reported directly to the gNB 180 from the WTRU 102.

Reflection Selection for IRS to WTRU Transmission

In certain representative embodiments, a WTRU 102 may assume or determine that a gNB 180 has determined and/or been informed of a (e.g., best) beam for transmission to the IRS. As described above, for example, the beam (and/or RS) to be used for transmission may be determined based on one or more received indications (e.g., CRI, SSBRI, SRI, SRS resource set, panel index, etc.). In certain representative embodiments, a WTRU 102 may assume there are M transmission events of configured reference signals (e.g., CSI-RS, SSB, SRS, etc.) using the beam (e.g., the best beam which was selected and/or determined for gNB to IRS transmission). For example, the WTRU 102 may identify each transmission event of a configured beam (e.g., reference signal and/or synchronization signal) by an index included in a sequence of transmission of the configured reference signals.

For example, a configured beam may be based on one or more transmissions of an SSB reference signal. The WTRU 102 may be configured to complete its measurements over M SSB bursts. As another example, a configured beam may be based on one or more transmissions of a CSI-RS reference signal. The WTRU 102 may assume that similar to the case where the higher layer parameter repetition in NZP-CSI-RS-ResourceSet associated with a CSI-RS resource set is ON, the CSI-RS resources within the NZP-(SI-RS-ResourceSet are transmitted with a same downlink spatial domain transmission filter.

As another example, the WTRU 102 may assume that during M transmission events, an IRS reflection parameter sets are cycled over the M transmission events, such cycling may result in multiple (e.g., M) different reflections or reflected beams from the IRS 204 to the WTRU 102. The WTRU 102 may perform measurements for each of the transmission event. The WTRU 102 may report one or more indices to indicate a preferred IRS reflection parameter set, such as based on the measurements performed on the reflected beams associated with the M transmission events.

Mode (a) Extension to Joint Beam Selection Among Beams from gNB to IRS and from IRS to WTRU In certain representative embodiments, a gNB 180 may configure a set of beams (e.g., a set of RSs, total L beams, and/or K beams, etc.) to a WTRU 102. The set of beams may correspond to a set of CSI-RS resources or a set of SSB indexes, such as for joint beam selection. The set of beams may correspond to a mixed set of CSI-RS resources and SSB indexes, such as for joint beam selection. A beam (e.g., a RS, a CSI-RS resource, an SSB index) of the set of beams may be configured to be (e.g., repeatedly) transmitted as a burst in a time-domain (e.g., across multiple (adjacent) symbols) and/or in a frequency-domain (e.g., across multiple adjacent or non-adjacent RBs). For example, repeated transmissions of a same beam of the set of beams may correspond with different IRS parameters (e.g., different IRS reflections) which may be applied across the repeated transmissions of the same beam transmitted from the gNB 180.

The WTRU 102 may measure beam qualities of the set of beams, and may report a beam index (e.g., of a best or preferred beam). Each beam of the set of beams may be measured for one or more (e.g., across) repeated transmissions to select an IRS reflection parameter. The WTRU 102 may report a preferred beam index and a repetition index (e.g., of one of the repeated beam transmissions) as a paired reporting content for jointly selected beam information. The WTRU 102 may also report (e.g., at the same time) a corresponding beam quality metric (e.g., an RSRP value, L3-RSRP, L1-RSRP, RSRQ, L1-SINR, and/or CQI) along with information indicating the selected pair of {beam index, its repetition index}.

In an example, if the repetition is applied in the time-domain, the repetition index may comprise a symbol index and/or a slot index. The symbol index may be re-numbered (e.g., starting from a lowest value, such as 0 or 1) as the repetition index for each beam of the set of beams.

For example, a first beam of the set of beams may be a CSI-RS resource #1, and the CSI-RS resource #1 may be repeatedly transmitted across symbol indexes 3 to 6 in a slot n (e.g., according to a pre-configuration from the gNB 180). After, the WTRU 102 may identify the (e.g., re-numbered) repetition indexes as being 0 to 3, which may be used for the paired reporting content for jointly selected beam information. The WTRU 102 may report information indicating the pair of {CRI #1, repetition index #2}, such as where the paired beam information of {CRI #1, repetition index #2} shows a preferred outcome of the joint beam selection among the set of beams. The paired beam information may be transmitted along with information indicating the one or more corresponding beam quality metrics.

For example, a second beam of the set of beams may be a CSI-RS resource #2, and the CSI-RS resource #2 may be repeatedly transmitted across symbol indexes 2 to 9 in a slot m (e.g., according to a pre-configuration from the gNB 180). After, the WTRU 102 may identify the (e.g., re-numbered) repetition indexes as being 0 to 7, which may be used for the paired reporting content for jointly selected beam information. The WTRU 102 may report information indicating the pair of {CRI #2, repetition index #5}, such as where the paired beam information of {CRI #2, repetition index #5} shows a preferred outcome of the joint beam selection among the set of beams. The paired beam information may be transmitted along with information indicating the one or more corresponding beam quality metrics.

In certain representative embodiments, the gNB 180 may configure and/or indicate how the WTRU 102 is to determine the (e.g., preferred) paired beam information from the joint beam selection among the set of beams. For example, the WTRU 102 may be configured (or indicated) with at least one threshold value. If a beam quality for the paired beam information (e.g., {CRI #2, repetition index #5}) is determined (e.g., calculated) to be higher than the threshold value, the WTRU 102 may report paired beam information indicating {CRI #2, repetition index #5} (e.g., along with the corresponding beam quality metrics).

In certain representative embodiments, the gNB 180 may configure/indicate configure and/or indicate a number of preferred paired beams which are to be reported. For example, a parameter P, representing an upper limit of how many preferred paired beams are or may be reported, may be configured and/or indicated to the WTRU 102. In an example of P=2, the WTRU 102 may report both {CRI #1, repetition index #2} and {CRI #2, repetition index #5} (e.g., along with the corresponding beam quality metrics), such as where both quality metrics of the beams are higher than the threshold value. In an example of P=4, the WTRU 102 may report up to 4 preferred paired beams which may include, for instance, {CRI #1, repetition index #2}, {CRI #2, repetition index #5}, {CRI #2, repetition index #6}, and {CRI #7, repetition index #1} (e.g., along with the corresponding beam quality metrics), such as where the corresponding beam quality metrics of each paired beam information is higher than the threshold value.

The WTRU 102 may select the P=4 preferred paired beams, after applying a sorting procedure based on beam quality values. For example, the above 4 reported paired beams may have the 4 highest beam qualities across the set of beams. In an example, the WTRU 102 may be allowed to select more than two repetition indexes for the same beam, e.g., as shown in the above reporting comprising {CRI #2, repetition index #5} and {CRI #2, repetition index #6} for the same CRI #2. The gNB 180 may (further) configure/indicate for the WTRU 102 (up to) how many repetition indexes for a same beam index may be reported (at a time). For example, a parameter R representing the number of "(up to) how many repetition indexes for a same beam index may be reported" may be configured/indicated to the WTRU 102. In an example of R=2, the WTRU 102 may report both {CRI #2, repetition index #5} and {CRI #2, repetition index #6} for the same CRI #2, as in the above example. In an example of R=1, the WTRU 102 may report either one of {CRI #2, repetition index #5} and {CRI #2, repetition index #6} for the same CRI #2. The WTRU 102 may choose to report {CRI #2, repetition index #6} in that case, based on determining a beam quality of {CRI #2, repetition index #6} is higher than that of {CRI #2, repetition index #5}.

In some cases, the joint beam selection may realize benefits of efficiency and/or further optimized performance in terms of the joint beam selection comprising a beam refinement by including the selection of a preferred IRS parameter but at the expense of increased complexity at the WTRU 102 as compared to the two step approach of described above in mode (a).

In certain representative embodiments, a gNB 180 may configure, indicate and/or update a periodicity of performing the joint beam selection process. For example, after receiving reporting of a reliable IRS parameter set (e.g., IRS reflection) along with a (e.g., preferred and/or reliable) selection of at least one beam of the set of beams, the gNB 180 may reconfigure and/or update (e.g., by sending an update message such as by a MAC-CE or by a DCI, etc.) a first periodicity of transmissions of the set of beams to the WTRU 102 and/or a second periodicity of WTRU reporting for the joint beam selection (e.g., with parameters P and/or R). The first periodicity and the second periodicity may be the same (e.g., pre-defined, pre-determined, or configured/indicated by the gNB 180), where (e.g., only) an offset value may be configured, indicated and/or added for the WTRU reporting, such that the WTRU 102 may report a measured set of beams after the offset value has lapsed (e.g., from the reception of the reconfiguration or updated configuration).

In certain representative embodiments, a gNB 180 may configure, indicate and/or update at least one configuration for a burst in a time-domain (e.g., across multiple (adjacent) symbols) and/or in a frequency-domain (e.g., across multiple adjacent and/or non-adjacent RBs) for a beam of the set of beams. For example, a burst may be updated to have a lowered number of repetitions for the beam. In an example, after receiving reporting of a reliable IRS parameter set (e.g., IRS reflection) along with a (e.g., preferred and/or reliable) selection of at least one beam of the set of beams, the gNB 180 may reconfigure and/or update (e.g., by sending an update message such as by a MAC-CE or by a DCI, etc.) at least one configuration for the burst (e.g., to have a lowered number of repetitions for the beam, such as for more overhead and/or a latency reduction for further tracking beam refinement via adjusting IRS parameters), such as to adapt to wireless channel variations and/or WTRU mobility.

Beam Selection Mode (b)

FIG. 4B shows a high-level view of beam selection in Mode (b). In certain representative embodiments, a WTRU 102 may assume that an IRS reflection parameter set is fixed (e.g., a same IRS reflection parameter set is active) at least for the duration of transmission of beams during beam selection in Mode (b). As shown in FIG. 4B, the IRS 204 may be positioned to provide one or more reflected beams 412 to a receiver 206 (e.g., a WTRU 102). As shown in FIG. 4B, beams and/or reference signals transmitted by the gNB 180 may be identified by respective CRIs, such as in the case where the reference signals are CSI-RS. It should be understood by those skilled in the art that the beams and/or reference signals transmitted by the gNB 180 and/or reflected by the IRS may be identified by other indices (e.g., SSBRI) such as when signals other than CSI-RS are transmitted.

In certain representative embodiments, a WTRU 102 may be configured to receive two separate sets of Q and P reference signals. The first set of reference signals may be associated with a first set of Q beams 414 intended for transmission to an IRS. The second set of reference signals may be associated with a second set of P beams 416 intended for direct transmission to the WTRU 102. For example, a WTRU 102 may be configured with a set of reference signals for each set of Q and P beams semi-statically and/or dynamically. For example, a WTRU 102 may receive a first dynamic indication to activate one or more subsets of reference signals for beam selection. Further, a WTRU 102 may receive a second dynamic indication to select a subset from the activated set reference signals. The WTRU 102 may be configured with two CSI configurations corresponding to each of sets of Q and P reference signals.

In certain representative embodiments, a WTRU 102 may be configured (e.g., additionally configured) with at least one reference signal to be used as a reference for measuring delay. For example, a signal may be configured as the reference signal for delay measurements and may be one of the reference signals configured in the sets of Q and/or P reference signals. As another example, a signal configured as the reference signal for delay measurements may be outside (e.g., separate from) the reference signals defined in sets of Q and P reference signals. There may be two sets of CSI-RS references signals be configured for the sets of P and Q beams, and the configured reference signal for delay measurement may be any of one of the CSI-RSs configured in one of the sets of Q and P reference signals, a different CSI-RS, an SSB, a positioning RS, a non-NR beacon signal, a GPS signal, a Tracking Reference Signal (TRS), etc.

For example, a WTRU 102 may perform any of the following measurements on any (e.g., each) of the received Q and/or P beams 410, 412 corresponding to the sets of Q and/or P reference signals. The WTRU 102 may perform a signal quality measurement (e.g., RSRP) on a received beam. The WTRU 102 may be configured to receive the reference signals associated with the sets of P and Q beams simultaneously or in a sequential manner. The WTRU 102 may estimate a delay in receiving a configured reference signal associated with any (e.g., each) of the Q and/or P beams. As an example, the WTRU 102 may estimate the delay for any (e.g., each) of the beams based on an observed delay from the estimated channel using the received reference signals configured in sets P and Q. As another example, the WTRU 102 may estimate the delay for any (e.g., each) of the beams by performing a relative delay measurement with reference to another beam (e.g., a beam associated with a particular CSI-RS resource indicator 'CRI_x'). For certain embodiments, the WTRU 102 may estimate the transmission delay of each of the reference signals relative to the configured reference signal for delay measurement. As another example, the WTRU 102 may estimate the delay for any (e.g., each) of the beams based on the transmission of a signal with a low correlation property, e.g., ZC sequence or a PRACH. Using the beam associated to each reference signals configured in set P and Q, a sequence may be transmitted for estimation of the delay by the WTRU 102.

In certain representative embodiments, a delay (e.g., a reported delay) may be a determined (e.g., estimated and/or measured) delay. For example, the delay may be (e.g., indicated) as an absolute value, of the estimated and/or measured delay. For example, the delay may be expressed and/or indicated in (e.g., preconfigured or predetermined) units. As an example, the units may be time units such as seconds (e.g., nanoseconds or other sub-second units).

In certain representative embodiments, a delay (e.g., a reported delay) may be determined on a per beam basis. As an example, a delay may be determined per beam for a beam pair (e.g., a candidate beam pair). As an example, a delay may be determined as a relative delay (e.g., estimated and/or measured) between beams of a beam pair (e.g., candidate beam pair).

In certain representative embodiments, a WTRU 102 may determine the preferred (e.g., best) pair or pairs of beams based on measured power and/or relative delay of the received Q and P beams. For example, a WTRU 102 may determine one or more best beam pairs by determining a beam pair (e.g., one of the Q beams and one of the P beams), such as beams 418 and 420, that exhibit a highest total power and least relative delay with respect to each other. The WTRU 102 may indicate one or more of the determined beam pairs to the gNB 180 (e.g., either directly or indirectly), such as by reporting the respective CRIs corresponding to each determined beam pair. As another example, the gNB 180 may indicate a (e.g., best) beam pair based on receiving feedback of WTRU measurements of the Q and P beams.

In certain representative embodiments, a WTRU 102 may determine the preferred (e.g., best) pair or pairs of beams using (e.g., conditioned) on a property and/or parameter, such as a channel property. For example, a WTRU 102 may be configured with a (e.g., minimum) rank. The rank may be a rank which is supported by a (e.g., preferred and/or best) beam pair. The (e.g., minimum) rank may be specified as a rank per supporting beam and/or as an overall rank for the channel supported by the beam pair. As an example, a minimum supported rank (e.g., rank equal to 2) may be specified (e.g., configured and/or indicated) per beam, and only those beams which support at least the minimum rank (e.g., support a rank greater than or equal to 2) may be considered (e.g., estimated and/or measured) and/or reported for beam pair selection. As another example, a minimum supported rank may be specified (e.g., configured and/or indicated) as an overall rank (e.g., rank equal to 4) for a beam pair, any (e.g., all) combinations (e.g., a beam pair with ranks of 1 and 3, 2 and 2, and/or 3 and 1) of beams which support the overall rank may be considered (e.g., estimated and/or measured) and/or reported for beam pair selection.

In certain representative embodiments, a WTRU 102 may report J sets of measurements associated with reception of the beams of the configured sets. Each of the reported measurements may correspond to one or more of preconfigured qualifying metrics. For example, the WTRU 102 may assume J, the number of sets, is fixed or may receive a semi-static or dynamic configuration which includes information indicating a value of J. For example, the qualifying metrics may include one or more signal quality measurements (e.g., signal strength such as RSRP, SNR, SINR, RSSI and/or RSRQ) and/or one or more delay measurements. For example, the WTRU 102 may report one or more measurements of beams that on condition that respective signal quality measurements (e.g., RSRP) exceeds a first (e.g., configured) threshold and/or respective relative delay measurements are less than a second (e.g., configured) threshold. One or more of the configured thresholds for the sets P and Q may be different (e.g., there may be a different RSRP threshold for each set).

Figure 5:
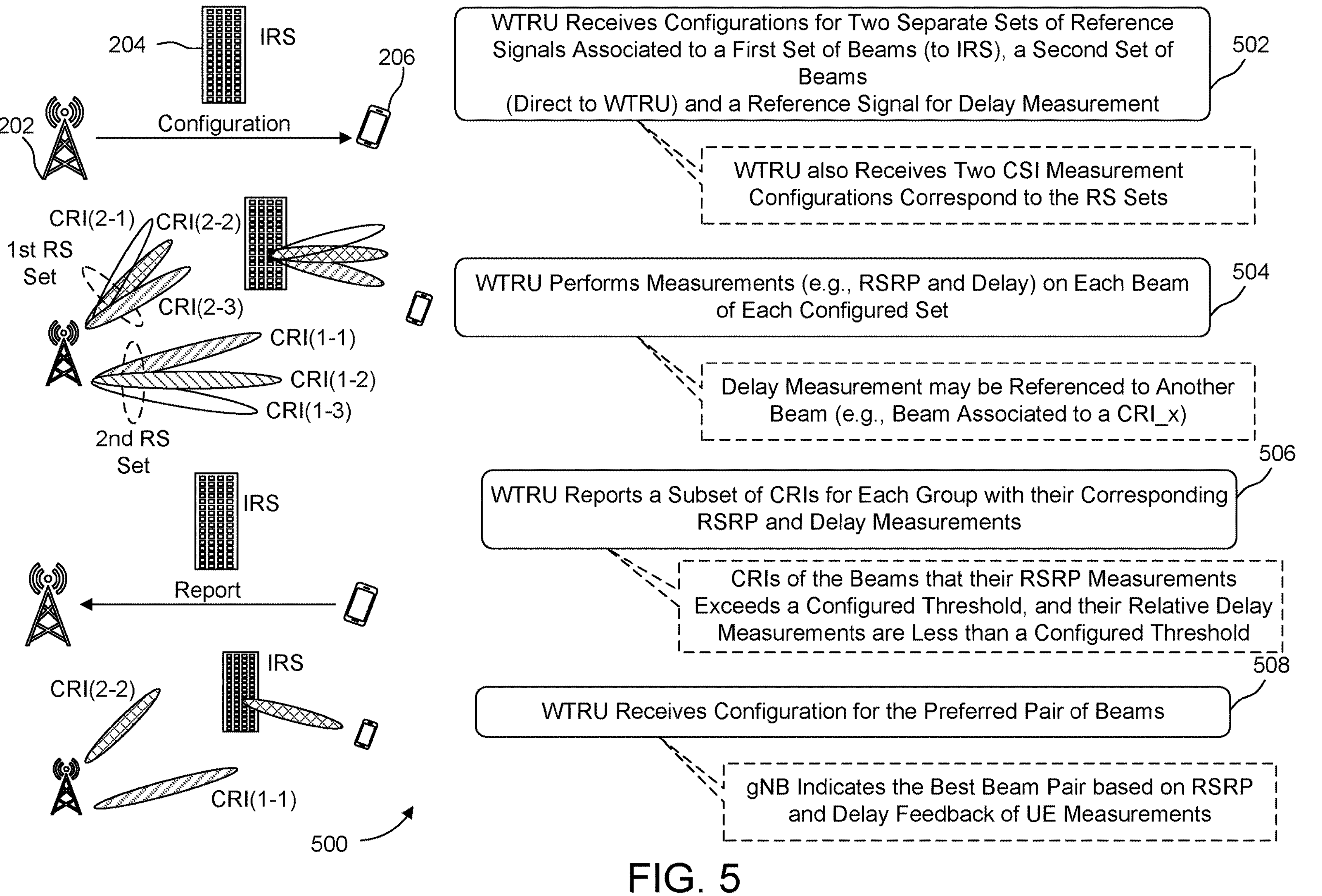
FIG. 5 is a system diagram illustrating a representative beam management procedure in the second mode.

As an example, a WTRU 102 may report J pairs of beam and/or signal identifiers (e.g., CRIs), their corresponding qualifying metrics (e.g., signal quality and delay values). FIG. 5 is a system diagram illustrating a representative beam management procedure 500 in the second mode (e.g., Mode (b)). As shown in FIG. 5, a WTRU 102 may receive configurations for two separate sets of reference signals (RSs) associated to a first set of beams (e.g., for transmission to the IRS 204) and a second set of beams (e.g., for transmission directly to the WTRU 102), and a reference signal for delay measurement at 502. At 502, the WTRU 102 may also receive two CSI measurement configurations that correspond to the first and second RS sets. At 504, the WTRU 102 may perform measurements (e.g., RSRP and delay) on each beam of each of the first and second configured sets of beams. At 504, the delay measurement may be referenced to another beam (e.g., a beam associated with a CRI_x). At 506, the WTRU 102 may send a report (e.g., to the gNB 180) which includes information for a subset of CRIs for each group (e.g., first set and second set) with their corresponding RSRP and delay measurements. At 506, the CRIs of the beams may be for the CRIs of the beams having their RSRP measurements that exceed a configured threshold RSRP and their relative delay measurements that are less than a configured threshold delay amount. As an example, the report may include two candidate sets, such as candidate beam set 1 which includes: {CRI(1-1), CRI(2-2)}, {$RSRP_{CRI(1-1)}$, $RSRP_{CRI(2-2)}$}, delay(1) and candidate beam set 2 which includes: {CRI(1-2), CRI(2-3)}, {$RSRP_{CRI(1-3)}$, $RSRP_{CRI(2-1)}$}, delay(2). The reported candidate sets may identify respective candidate beam pairs having qualified metrics which meet and/or exceed the configured threshold values.

After reporting of the candidate sets at 506, the WTRU 102 may receive (e.g., from the gNB 180) information indicating a preferred beam set (e.g., a best beam pair from the P and Q sets of beams) at 508. At 508, the base station (e.g., gNB 180) may indicate a best beam pair based on the RSRP measurements and the delay measurements that are feedback at 506. For example, the WTRU 102 may use the preferred beam set (e.g., indicated reference signals) as references for the reception and demodulation of downlink transmissions (e.g., PDCCH and/or PDSCH transmissions). As another example, the WTRU 102 may use the preferred beam set (e.g., indicated reference signals) as references for the update of spatial relation information for the WTRU 102 (e.g., a spatial filter) for uplink transmission such as PUSCH, PUCCH, and/or PRACH transmissions. As another example, the WTRU 102 may use the preferred beam set (e.g., indicated reference signals) as references for antenna panel selection and/or panel activation/deactivation at the WTRU 102.

In certain representative embodiments, a WTRU 102 may be configured and/or indicated to receive two (e.g., separate) sets of Q and P reference signals. The first set may be associated with a first set of Q beams, such as those intended for transmission to an IRS, and the second set of reference signal may be associated with a second set of P beams intended for direct transmission to the WTRU 102. In some representative embodiments, the WTRU 102 may be configured with at least one SRS transmission opportunity associated with the Q and P sets, and at least one SRS resource. For example, a WTRU 102 may determine a (e.g., preferred and/or best) beam-pair based on a signal quality parameter (e.g., RSRP, SINR, etc.). The WTRU 102 may use a (e.g., same) spatial filter used for the reception of each beam of the reported beam pair, and the WTRU 102 may transmit a RS (e.g., SRS) to assist the gNB 180 in determination of the relative delays between each beam of any (e.g., each) of the reported beam-pairs.

For example, a WTRU 102 may use a same spatial beam, panel and/or filter for the reception of beams associated with the P and Q sets. The WTRU 102 may perform a (e.g., single) SRS transmission on condition that the same spatial filter was used to receive the P and Q sets. The SRS transmission may use the same spatial beam and/or filter used for the reception. As another example, a WTRU 102 may use different spatial beams, panels and/or filters for the reception of beams associated with the P and Q sets. The WTRU 102 may perform multiple SRS transmissions on condition that different spatial beams, panels and/or filters were used to receive the P and Q sets. The SRS transmissions may use the different spatial beams, panels and/or filters used for the reception. The WTRU 102 may use a same or different SRS resource for each SRS transmission.

In certain representative embodiments, triggering of RS (e.g., SRS) transmission may be explicitly or implicitly triggered. For example, transmission of the SRS may be (e.g., always) linked to the CSI report related to best beam-pair (e.g., in $x^{th}$ slot after the CSI report), and no independent SRS triggering may be needed. Depending on the number of reported beam-pairs, there may be associated SRS transmissions. For example, after reporting a (e.g., best) beam-pair, a WTRU 102 may receive an indication (e.g., via DCI) as a trigger to initiate one or more SRS transmissions. The triggering transmission (e.g., DCI) may also include an implicit or explicit indication as to which reported beam-pairs the SRS transmission should be associated.

In certain representative embodiments, a WTRU 102 may report one more beam pairs from the Q and P sets as described herein (e.g., having a signal quality satisfying a threshold). The WTRU 102 may proceed to perform SRS transmission using the spatial beams, panels and/or spatial filters which were associated with the reception of the RSs of the Q and P sets. Upon receiving the one or more SRS which were transmitted (e.g. by the WTRU 102) using the (e.g., same) spatial beam, panel and/or filters as the reported beam pairs, a gNB 180 may proceed to determine a relative delay between corresponding pairs of SRS. For example, a relative delay between SRS pairs received by the gNB 180 (e.g., in the uplink direction) as described above may correspond (e.g., due to channel reciprocity) to a relative delay present in the reception of the beam pairs of the Q and P sets at the WTRU 102 (e.g., in the downlink direction).

In certain representative embodiments, a gNB 180 may have already determined a best beam for the WTRU 102 based on conventional procedures, such as beam selection procedures as specified in 5G NR Release 15 and/or 16. It may be beneficial to determine an additional beam by which the reception at the WTRU 102 may be enhanced, such as to gain additional reliability. As shown in FIG. 4B, it may be assumed that the gNB 180 has already selected a beam (e.g., corresponding to CRI(1-1) in the second beam set) as the best beam for the WTRU 102. Then, the WTRU 102 may coordinate with the gNB 180 to determine a second beam (e.g., in the first beam set which is reflected by the IRS), such as by simultaneous transmission, so that a beam pair can be selected to enhance reception at the WTRU 102.

For example, a WTRU 102 may be configured to receive (e.g., simultaneously) a first beam and a second beam. The first beam may have previously been selected using a first (e.g., conventional) beam selection method from the set of P beams. The second beam may be selected from one of the Q beams which may be intended for transmission to and/or reflection from the IRS.

As another example, the WTRU 102 may perform signal quality measurements (e.g., RSRP) on the combined power received from transmissions associated to the first and second beams. The measurement may be based on the assumption of continuous transmission of the first beam and/or simultaneous transmission of the first beam and the Q beams. The WTRU 102 may determine a preferred (e.g., best beam) from the second set of the Q beams, such as by identifying a second beam that yields a highest total power.

In certain representative embodiments, the WTRU 102 may transmit information indicating a preferred (e.g., best) beam. For example, the WTRU 102 may send a report which indicates a CRI, SSBRI, or the like associated with the preferred beam. As shown in FIG. 4B, the WTRU 102 may indicate CRI(2-2) as the preferred beam for transmission from the gNB to the IRS.

For example, a WTRU 102 may report J identifiers of reference signals and corresponding qualifying metrics (e.g., signal strength and/or relative delay values) to the gNB 180. As shown in FIG. 4B, a WTRU 102 may report two candidate beam (e.g., reference signal) sets. The two candidate beam information sets may identify two candidate beams as candidate beam information set 1 which may be reported as CRI(2-2), $RSRP_{CRI(2-2)}$, delay(1) and candidate beam information set 2 which may be reported as CRI(2-1), $RSRP_{CRI(2-1)}$, delay(2). The candidate beams that are reported may have measured qualifying metrics that meet and/or exceed the configured thresholds.

FIG. 5 is a system diagram illustrating a representative beam management procedure 500 in the second mode. As shown in FIG. 5, a WTRU 102 may receive information indicating a configuration for a first set of reference signals (e.g., associated with a first set of beams intended for transmission to an IRS) and/or a second set of reference signals (e.g., associated with a second set of beams intended for direct transmission to the WTRU 102). The WTRU 102 may also receive information indicating a reference signal for delay measurement.

After receiving the configuration of the first and/or second set of reference signals, the WTRU 102 may determine at least one signal quality measurement (e.g., RSRP) for each of the reference signals. For example, the WTRU 102 may receive information indicating qualifying metrics for each of the reference signals.

Upon receiving each of the reference signals, the WTRU 102 may determine a delay for each of the reference signals. For example, the WTRU 102 may measure the respective delay for each received beam (e.g., reference signal) relative to the indicated reference signal for delay measurement. The WTRU 102 may also perform at least one signal quality measurement of a received reference signal upon receiving each of the reference signals.

For each of the first and/or second sets of reference signals, the WTRU 102 may send a report including a subset of the signal measurements and associated beam (e.g., RS) identifiers where the subset of measurements corresponds to preferred beams in the respective set of beams for which the signal measurements meet and/or exceed a first threshold (e.g., at least one configured measurement threshold) and/or the delay is less than a second threshold (e.g., a configured delay threshold).

After reporting one or more preferred beams, the WTRU 102 may receive information indicating a configuration of a pair of beams (e.g., RSs) including one beam (e.g., RS) from the first set and one beam (e.g., RS) from the second set. For example, the gNB 180 may indicate the pair of beams from among the preferred beams included in the report. The gNB 180 may select the beam pair based on the measurements and identifiers included in the report.

In certain representative embodiments, a WTRU 102 may receive (e.g., configuration) information including information indicating a first set of RSs associated with a first set of beams (e.g., intended for transmission to an IRS), a second set of RSs associated with a second set of beams (e.g., intended for direct transmission to the WTRU 102), and/or a RS for delay measurement. The WTRU 102 may measure the first set of RSs and the second set of RSs. The WTRU 102 may send (e.g., report) information indicating a subset of the measured first set of RSs and a subset of the measured second set of RSs which are (e.g., each associated with (1) a respective RS measurement which satisfies a first threshold value, and/or (2) a respective delay measurement which satisfies a second threshold value. Each delay measurement may be relative to the RS for delay measurement. The WTRU 102 may receive information indicating a pair of RSs including a first RS from the subset of the first set of RSs and a second RS from the subset of the second set of RSs which were included in the report.

Mode (b) Extension for Multi-Panel WTRUs

As shown in FIG. 4B, the gNB 180 may transmit a first RS set and a second RS set. The first RS set and the second RS set may respectively correspond to any of: (1) a first TRP and a second TRP, (2) a first CORESET group and a second CORESET group, (3) a first gNB-panel (e.g., first DL-panel) and a second gNB-panel (e.g., second DL-panel), and/or (4) a first transmission entity at the gNB 180 and a second transmission entity at the gNB 180.

In certain representative embodiments, the gNB 180 may manage transmit beams in two or more major beam directions which may be intended for transmission to the WTRU 102. For example, one of the major beam directions (e.g., from gNB panel1 and/or from TRP1) may include a reflected path via the IRS, and another of the major beam directions (e.g., from gNB panel2 and/or from TRP2) may not include a reflected path via the IRS (e.g., a direct path from the gNB 180 to the WTRU 102).

In certain representative embodiments, the WTRU 102 may employ multiple panels (e.g., multiple WTRU panels, WTRU antenna groups, and/or WTRU transmission and/or reception entities, etc.), one of the major beam directions (e.g., from gNB panel1 and/or from TRP1) may correspond to one of the multiple WTRU panels (e.g., WTRU panel1) in terms of better reception quality compared to any other WTRU panels, and another of the major beam directions (e.g., from gNB panel2 and/or from TRP2) may correspond to another one of the multiple WTRU panels (e.g., WTRU panel2) in terms of better reception quality compared to any other WTRU panels.

The gNB 180 may configure and/or indicate to the WTRU 102 to report one or more preferred beam indexes by applying at least one restriction as follows for the reporting: (1) preferred beam index(es) are paired, each corresponding to a different WTRU panel; (2) preferred beam index(es) are paired, each corresponding to a different gNB panel (e.g., TRP); and/or (3) preferred beam index(es) are paired, each corresponding to a different WTRU panel and a different gNB panel (e.g., TRP).

For example, a WTRU 102 may select a beam #a (e.g., CRI #a) to be reported which the WTRU 102 receives (e.g., decides to receive) at WTRU panel1 (e.g., based on better reception quality compared to reception at other panel(s)). The WTRU 102 may select a beam #b (e.g., CRI #b) to be reported (e.g., at the same time) which the WTRU 102 receives (e.g., decides to receive) at WTRU panel2 (e.g., which should be different from panel1, due to restriction (1) to identify a preferred pairing for two major beam direction links).

For example, the WTRU 102 may select a beam #a (e.g., CRI #a) to be reported which is included in the first RS set. The WTRU 102 may select a beam #b (e.g., CRI #b) to be reported (e.g., at the same time) which is included in the second RS set (e.g., based on the restriction (2) to identify a preferred pairing for two major beam direction links).

For example, the WTRU 102 may select a beam #a (e.g., CRI #a) to be reported which is included in the first RS set and which the WTRU 102 may receive (e.g., decides to receive) at WTRU panel1. The WTRU 102 may select a beam #b (e.g., CRI #b) to be reported (e.g., at the same time) which is included in the second RS set and the WTRU 102 may receive (e.g., decides to receive) at WTRU panel2 (e.g., which should be different from panel1 based on the restriction (3) which combines restrictions (1) and (2)) to identify a preferred pairing for two major beam direction links.

While the foregoing examples are described in terms of two major beam directions, it should be understood that other representative embodiments may include procedures to identify preferred sets of more than two major beam direction links in a similar manner.

In certain representative embodiments, the gNB 180 may configure and/or indicate to the WTRU 102 to report (e.g., additionally report, such as at the same time) preferred beam index(es) without any of the restrictions above. For example, the gNB 180 may compare the reported preferred beam index(es) without any restrictions with those with at least one restriction. If the preferred beam index(es) without any restrictions are preferred to be used for further scheduling decisions, the gNB 180 may transmit scheduling information (e.g., for DL transmission) which includes information indicating a single-panel operation (e.g., reception) at the WTRU 102. If the preferred beam index(es) with at least one restriction are preferred to be used for further scheduling decisions, the gNB 180 may transmit scheduling information (e.g., for the DL) which includes information indicating a multi-panel operation (e.g., reception) at the WTRU 102. In some cases, the gNB 180 may perform such scheduling (e.g., dynamically) by indicating either a single-panel operation or a multi-panel operation to be performed at the WTRU 102.

For example, the gNB 180 may compare the reported preferred beam index(es) without any restrictions with those with at least one restriction. If the preferred beam index(es) without any restrictions are preferred to be used for further scheduling decisions, the gNB 180 may transmit scheduling information (e.g., for UL transmission) which includes information indicating a single-panel operation (e.g., transmission) from the WTRU 102. If the preferred beam index (es) with at least one restriction are preferred to be used for further scheduling decisions, the gNB 180 may transmit scheduling information (e.g., for UL transmission) which includes information indicating simultaneous transmission from multiple WTRU panels at the WTRU 102 (e.g., or dynamically selecting a single-panel UL transmission out of the multiple WTRU panels). In some cases, the gNB 180 may perform such scheduling (e.g., dynamically) by indicating either a single-panel transmission or a multi-panel transmission from the WTRU 102.

CSI-RS Transmission Modes

As described in TS 38.214 for 5G NR Release 16, a WTRU 102 may be configured with one or more NZP CSI-RS resource set configuration(s) as indicated by the higher layer parameters CSI-ResourceConfig, and NZP-CSI-RS-ResourceSet. Each NZP CSI-RS resource set may include K≥1 NZP CSI-RS resource(s). For example, the higher layer parameter repetition in NZP-CSI-RS-ResourceSet that is associated with a CSI-RS resource set may be set as 'ON'. On condition the parameter repetition is 'ON', the WTRU 102 may assume the CSI-RS resources within the NZP CSI-RS Resource Set are transmitted with a same downlink spatial domain transmission filter. A CSI-RS may use the same spatial filter to generate a beam in one spatial direction over the multiple repetitions of the CSI-RS. The WTRU 102 may sweep through its receive spatial filter over the repetitions and may measure the received signal quality (e.g., RSRP and/or SINR) for each repetition. The WTRU 102 may determine a spatial filter with a highest signal quality and the WTRU 102 may use this spatial filter whenever receiving a signal and/or transmission sent with the same transmit spatial filter as the CSI-RS resource.

In certain representative embodiments, a TRP (e.g., base station) may send a CSI-RS with a transmit filter that is reflected by the RIS onwards to a WTRU 102 which may use a receive spatial filter. For an optimal transmission with highest signal quality, the combination of transmit and receive spatial filters at the TRP and/or WTRU 102 and/or the reflection parameters at the RIS may need to be optimized. In order to determine a preferred (e.g., best) combination of transmit and receive spatial filters, the WTRU 102 may measure the received signal quality on a spatial receive filter when either the TRP sweeps (e.g., varies) its transmit spatial filter, the reflection parameters are swept (e.g., varied), or both are swept. For example, the reflection parameters may include a set of phase shifts applied at the RIS to reflect an incoming signal in a particular spatial direction.

In certain representative embodiments, a WTRU 102 may determine a CSI-RS repetition scheme. The WTRU 102 may determine or be configured with a (e.g., new) CSI-RS repetition scheme which may be defined as a RIS sweeping method. Under a RIS sweeping method, a WTRU 102 may determine that one CSI-RS resource may sweep through different transmit spatial filters and/or RIS reflection parameters.

For example, the WTRU 102 may determine the activation of RIS sweeping (e.g., CSI-RS repetition scheme) from a received information element (e.g., RIS-Sweep IE) which may be indicated in a dynamic and/or semi-static fashion. A RIS-sweep IE may include an activation pattern. The sweep may be activated in a pattern which may be defined for a duration of X milliseconds, frames, sub-frames, slots, mini-slots or symbols which occurs every Y milliseconds, frames, sub-frames, slots, mini-slots or symbols. The WTRU 102 may determine a starting point of the pattern based on an absolute slot number or a slot number relative to receiving an activation signal.

The WTRU 102 may determine that a RIS sweeping period is preconfigured as part of a broadcast message such as a SIB or MIB. The WTRU 102 may receive a DCI triggering RS transmission which indicates the RIS-Sweep IE. The WTRU 102 may receive a (e.g., new or existing) MAC-CE which indicates the RIS-Sweep IE. The RIS-Sweep IE may be defined as an IE field within a CSI-RS configuration IE. The RIS-Sweep IE may be defined as a separate IE from the CSI-RS configuration IE.

In certain representative embodiments, a WTRU 102 may determine different RIS sweeping modes of operation where a given mode of operation is defined based on whether the sweeping happens between a TRP and a RIS 204, a RIS 204 and a WTRU 102, or both. A WTRU 102 may determine different modes of beam pairing function based on at least joint use of CSI-RS repetitions and/or a RIS-Sweep configuration. Depending on a combination of a CSI-RS repetition setting and/or a RIS-Sweep configuration, a WTRU 102 may determine whether it should sweep its receive spatial filter to perform receive spatial filter selection or not, and/or whether it may be triggered to feedback a CSI report.

The RIS-Sweep IE may contain a field explicitly (or implicitly) indicating a RIS sweeping mode of operation. For example, in a RIS mode 1 (e.g., a WTRU receives information indicating: (1) CSI-RS repetition=OFF and (2) IRS-Sweep=ON), a transmit spatial filter on a CSI-RS sent between a TRP and a RIS 204 may sweep through multiple spatial directions while the RIS sweeps through different reflection parameters. As another example, in a RIS mode 2 (e.g., a WTRU 102 receives information indicating: (1) CSI-RS repetition=ON and (2) IRS-Sweep=ON), a transmit spatial filter on a CSI-RS sent between a TRP and a RIS 204 may remain fixed over the repetitions while the RIS sweeps through different reflection parameters. In mode 2, the WTRU 102 may determine a one-to-many mapping between one CSI-RS configuration and/or one CSI-RS spatial filter to a set of reflection parameters for the RIS, where each reflection parameter set steers (e.g., reflects) the CSI-RS into a different spatial direction.

As another example, in a RIS mode 3 (e.g., a WTRU receives information indicating: (1) CSI-RS repetition=OFF and (2) IRS-Sweep=OFF), a transmit spatial filter on a CSI-RS sent between a TRP and a RIS 204 may sweep through multiple spatial directions while the RIS keeps a fixed reflection parameter. In mode 3, the WTRU 102 may determine a one-to-many mapping between one reflection parameter set and multiple CSI-RS configurations and/or CSI-RS spatial filters. The mapping may be configured (or re-configured) via RRC messaging and/or a MAC-CE. As another example, in a RIS mode 4 (e.g., a WTRU receives information indicating: (1) CSI-RS repetition=ON and (2) RIS-Sweep=OFF), a spatial filter on a CSI-RS sent between a TRP and a RIS 204 is fixed while the RIS keeps a fixed reflection parameter.

In certain representative embodiments, a WTRU 102 may receive configurable parameters k1 and/or k2. The WTRU 102 may determine a number of CSI-RS spatial filters and a RIS reflection parameters that are respectively swept from k1 and/or k2. For example, k1 and/or k2 may map to a subset of all configured CSI-RS spatial filters and/or RIS reflection parameters. The WTRU 102 may receive a MAC-CE and/or DCI that indicates which subset to use and/or indicates how the k1 and k2 are mapped to indices of the resources in the subset. For example, a WTRU 102 may determine any of (1) that RIS-mode 1 is configured when k1 and k2 are configurable values larger than 1; (2) that RIS-mode 2 is configured when k1=1 and k2 is a configurable value larger than 1; and/or (3) that RIS-mode 3 is configured when k1 is a configurable value larger than 1 and k2=1.

For example, on condition that any of RIS-Mode 1, RIS-Mode 2, or RIS-Mode 3 is indicated, a WTRU 102 may assume beam sweeping by the gNB 180, and the WTRU 102 may perform transmission beam selection. The WTRU 102 may determine to keep its receive spatial filter fixed, and the WTRU 102 may measure a signal quality for each transmitted beam (e.g., beams transmitted from the gNB), and report CSI including any of: (1) measured signal quantities (e.g., RSRP, SINR, CQI, PMI, RI, and/or LI); (2) a resource index when the TRP sweeps through multiple transmit spatial filters (e.g., CRI); (3) a reflection parameter set index when the RIS sweeps through multiple reflection parameter sets; and/or (4) a RIS index (e.g., in systems where multiple RIS are deployed).

For example, on condition that RIS-Mode 4 is indicated, a WTRU 102 may assume a fixed beam for gNB 180, and the WTRU 102 may perform received beam selection. The WTRU 102 may perform received beam selection by adjusting its spatial filter for every repetition instance of a CSI-RS and measuring the signal qualities received on different spatial receive filters. The WTRU 102 may report an RS index associated with a receive spatial filter corresponding to a highest signal quality. For example, a WTRU 102 may report a SRS index with a same spatial filter that corresponding to the highest measured signal quality.

Beam Indication

In certain representative embodiments, a WTRU 102 may be configured (e.g., by explicit or implicit indication) with a time domain pattern, such as one or more sets of time resources (e.g., one or more milliseconds, frames, sub-frames, slots, mini-slots, symbols, etc.). For example, a WTRU 102 may be configured with a time domain pattern based on any of: (1) MIB (Master Information Block), (2) SIB (System Information Block), (3) RRC, (4) MAC CE, and/or (5) DCI. The DCI may be based on a WTRU-specific DCI format or a group DCI format. For example, a group of WTRUs may receive the information based on the group DCI format.

In certain representative embodiments, a WTRU 102 may use a predefined time domain pattern such as one or more sets of time resources (e.g., one or more milliseconds, frames, sub-frames, slots, mini-slots, symbols, etc.).

In certain representative embodiments, a WTRU 102 may use a time pattern that may be linked to whether an IRS or a group of IRSs is on and/or off. Alternatively, a time pattern may be associated with different reflection parameter sets of a single or multiple IRSs in a system.

In certain representative embodiments, whether to use a predefined time domain pattern and/or a configured/indicated time domain pattern may be determined based on a gNB configuration/indication. For example, on condition that a gNB 180 does not configure/indicate a time domain pattern, the WTRU 102 may determine to use the predefined time domain pattern. If the gNB 180 configures/indicates a time domain pattern, the WTRU 102 may use the configured/indicated time domain pattern.

In certain representative embodiments, a WTRU 102 may identify a quasi co-location (QCL) relationship (e.g., one or more of Doppler shift, Doppler spread, average delay, delay spread and/or Spatial Rx parameter) based on the predefine time domain pattern. For example, the WTRU 102 may determine a first set of QCL relationships based on a first set of time resources and a second set of QCL relationships based on a second set of time resources.

The identification of a QCL relationship may be based on one or more of following: (1) a RS associated with a transmission configuration index (TCI) state, (2) multiple RSs associated with a TCI state, and/or (3) multiple TCI states. For example, the WTRU 102 may be configured with one or more TCI states and each TCI state may be configured with a RS (e.g., per QCL type). The WTRU 102 may determine the first quasi co-location relationship based on a RS transmitted in the first set of time resources and the second quasi co-location relationship based on a (e.g., different) RS transmitted in the second set of time resources. As another example, the WTRU 102 may be configured with one or more TCI states and each TCI state may be configured with a first RS and a second RS (e.g., per QCL type). The WTRU 102 may determine the first quasi co-location relationship based on the first RS and the second quasi co-location relationship based on the second RS. Whether to use the first RS or the second RS may be determined based on the time domain pattern. For example, the WTRU 102 may use the first RS in the first set of time resources and the second RS in the second set of time resources. As another example, the WTRU 102 may be configured with one or more TCI states for a first TCI state set and one or more TCI states for a second TCI state set. Each TCI state may be configured with a RS (e.g., per QCL type). The WTRU 102 may determine the first quasi co-location relationship based on a RS of a configured/indicated TCI state of the first TCI state set and the second quasi co-location relationship based on a (e.g., different) RS of a configured/indicated TCI state of the second TCI state set. Whether to use the first TCI state set or the second TCI state set may be determined based on the time domain pattern. For example, the WTRU 102 may use the first TCI state set in the first set of time resources and the second TCI state set in the second set of time resources.

Based on the identified QCL relationships, the WTRU 102 may transmit and/or receive one or more signals and/or channels. For example, the WTRU 102 may use a first set of QCL relationships to transmit and/or receive a first signal and/or a first channel in the first set of time resources. The WTRU 102 may use a second set of QCL relationships to transmit and/or receive a second signal and/or a second channel in the second set of time resources. The one or more signals and/or channels may include any of the following: (1) DM-RS ports of PDSCH; (2) DM-RS ports of PDCCH; (3) CSI-RS ports(s) of a CSI-RS resource; (4) DM-RS ports of PUSCH; (5) DM-RS ports of PUCCH; (6) SRS port(s) of an SRS resource; (7) PDSCH; (8) PDCCH; (9) PUSCH; and/or (10) PUCCH.

An identification of a QCL relationship may be based on following quasi co-location types: (1) 'QCL-TypeA': {Doppler shift, Doppler spread, average delay, delay spread}; (2) 'QCL-TypeB': {Doppler shift, Doppler spread}; (3) 'QCL-TypeC': {Doppler shift, average delay}; and/or (4) 'QCL-TypeD': {Spatial Rx parameter}.

In certain representative embodiments, a WTRU 102 may apply different identification methods for determining the QCL relationship based on the configured quasi co-location types. For example, for a first quasi co-location type (e.g., QCL-Type A, B or C), the WTRU 102 may identify the QCL relationship using criteria without considering the time domain pattern (e.g., assuming same channel parameters for all time resources). The WTRU 102 may identify the QCL relationship for some QCL types based on a preconfiguration without considering the time domain pattern. For a second QCL type (e.g., QCL-Type D), the WTRU 102 may identify the QCL relationship based on the time domain pattern (e.g., a first QCL relationship based on RSs in the first set of time resources and a second QCL relationship based on RSs in the second set of time resources).

In certain representative embodiments, a WTRU 102 may apply different beam application times based on the time domain pattern. For example, the WTRU 102 may be configured/indicated with a first TCI state (e.g., a previously configured/indicated TCI state) and a second TCI state (e.g., a newly configured/indicated TCI state). If the second TCI state is indicated in the first set of time resources or for the first set of time resources, the WTRU 102 may apply the second TCI state in n+X slots/mini-slots/symbols where n may be a slot/mini-slot/symbol in which the WTRU 102 receives a beam indication or the WTRU 102 reports an ACK/NACK of the beam indication and X may be a number of slots/mini-slots/symbols. Before the n+X slots/mini-slots/symbols, the WTRU 102 may apply the first TCI state. If the second TCI state is indicated in the second set of time resources or for the second set of time resources, the WTRU 102 may apply the second TCI state in n+Y slots/mini-slots/symbols where n may be a slot/mini-slot/symbol in which the WTRU 102 receives a beam indication or the WTRU 102 reports an ACK/NACK of the beam indication and Y may be a number of slots/mini-slots/symbols.

In certain representative embodiments, a WTRU 102 may determine whether to apply an (e.g., newly) indicated beam for the first set of time resources or the second set of time resources. For example, the WTRU 102 may determine to apply an indicated beam based on any of the following: (1) a time resource set, (2) a TCI state set, (3) time resources for receiving a beam indication, and/or (4) RNTI. For example, the WTRU 102 may receive information indicating a time resource set and/or a TCI state set. The information may be an explicit or implicit indication based on any of RRC, MAC CE and/or DCI. As another example, the WTRU 102 may receive a beam indication in a first set of time resources, and the WTRU 102 may apply the (e.g., newly) indicated beam for the first set of time resources. If the WTRU 102 receives a beam indication in a second set of time resources, the WTRU 102 may apply the (e.g., newly) indicated beam for the second set of time resources. As another example, the WTRU 102 may receive a beam indication with a DCI scrambled with a first RNTI, and the WTRU 102 may apply the (e.g., newly) indicated beam for a first set of time resources. If the WTRU 102 receives the beam indication with a DCI scrambled with a second RNTI, the WTRU 102 may apply the (e.g., newly) indicated beam for the first set of time resources.

Reporting with Multiple IRS Configurations

In certain representative embodiments, the WTRU 102 may be configured to measure and report CSI and/or measurement types such as RSRP, RSRQ, RSSI or interference conditioned on at least one state, which may be referred to herein as a "reflective configuration (RC) state." The configured reporting may by the network to optimize scheduling and IRS configurations, such as in deployments where one IRS configuration among a set of a finite number of IRS configurations is applied at a given time and/or for a given frequency range.

In certain representative embodiments, at least one measurement resource may be associated with a RC state, or vice versa. A WTRU 102 may determine a mapping between an RC state and a measurement resource set and/or a measurement resource for a signal and/or interference (e.g., CSI-RS, SSB or CSI-IM) in at least one occasion of such resource. A mapping between an RC state and a measurement resource set and/or a measurement resource maybe defined in one or more ways.

For example, the WTRU 102 may associate each occasion of a measurement resource set or a measurement resource with at least one RC state. For example, the WTRU 102 may determine an RC state by receiving signaling associated with a measurement resource set or a measurement resource. The signaling may indicate which RC state is applicable to a specific (e.g., one or more) or all occasions. For example, a m-th occasion of a resource may be associated to a k-th RC state where m mod R=k and R is a number of RC states.

For example, the WTRU 102 may (e.g., first) associate a time symbol, mini-slot, slot, subframe, frame or another time unit to an RC state and then determine the RC state applicable to an occasion of a measurement resource based on the time symbol(s), mini-slot, slot, subframe, frame or another duration corresponding to the occasion. The WTRU 102 may receive signaling indicating an RC state for at least one time symbol, mini-slot, slot, subframe, frame or another duration. As an example, the received signaling may consist of at least one of the following: (1) a time pattern for at least one RC state, and/or (2) a periodicity and/or offset for at least one state. The time pattern may be in units of symbols, mini-slots, slots, subframes, frames, milliseconds or another time unit. In certain embodiments, a (e.g., one) bitmap may be indicated for each RC state where a value (e.g., "1") may indicate that the RC state is applicable to the time unit. In certain embodiments, a RC state index may be indicated for one or more (e.g., each) time unit. In certain embodiments, the time pattern may be recurring and/or indicated to be recurring. The periodicity and/or offset for at least one RC state may be in units of symbols, mini-slots, slots, subframes, frames, milliseconds or another time unit. In certain embodiments, more than one RC state may map to a certain time unit, and the WTRU 102 may determine an applicable RC state based on a priority order (e.g., largest periodicity or smallest/largest RC state index). In certain representative embodiments, the WTRU 102 may determine that two or more (e.g., all) RC states that map are applicable.

For example, a start of a time pattern and/or a periodicity and/or an offset may be referenced to a start of a frame (e.g., identified by a system frame number), subframe, slot mini-slot, and/or time symbol. The periodicity, offset, number of RC states and/or other parameters may be configured by RRC or MAC signaling. For example, the signaling may consist of RRC signaling (e.g., dedicated or broadcast), MAC signaling, DCI signaling (e.g., unicast or group-common) or a combination thereof. As an example, the WTRU 102 may receive (e.g., firstly receive) RRC signaling including information indicating that a default RC state applicable to at least one time unit. The RRC signaling may also include information indicating that no RC state is assigned for at least one time unit. The WTRU 102 may receive (e.g., after the RRC signaling) a group-common DCI indicating one or more applicable RC states for at least one time unit. The indication from the group-common DCI may override the indication from RRC signaling, or provide the applicable RC state in case the RRC signaling indicated no applicable RC state for the corresponding time unit.

In certain representative embodiments, CSI reporting may occur for one or more RC states. A WTRU 102 may be configured to report CSI for at least one specific RC state. The one or more RC states may be indicated as part of a CSI report configuration and/or a CSI aperiodic state trigger. The WTRU 102 may be configured to report CSI for resources associated with one or more RC states. For example, the WTRU 102 may determine the CSI (e.g., to be reported) from a union of measurement resources associated to two or more RC states.

The WTRU 102 may be configured to report CSI for a RC state that maximizes and/or minimizes one or more criteria. For example, a RC state may be one which firstly maximizes RI and secondly maximizes CQI for this RI. As another example, a RC state may be one in which the interference over measurement resources for interference is minimized and/or maximized. The WTRU 102 may also report an indication of a panel that maximizes and/or minimizes the criteria, such as where the WTRU 102 measures CSI from more than one panel.

In certain representative embodiments, there may be multiple types of CSI reporting associated with an RC state. A WTRU 102 may report at least one of the following types of information obtained from measuring over resources associated with an RC state: (1) statistics of interference, SINR and/or CQI (e.g., average, standard deviation, percentile, minimum, maximum); (2) amount (e.g., percentage) of time and/or time occasions for which interference is above a configured threshold; (3) amount (e.g., percentage) of time and/or time occasions for which CQI and/or RI is below a configured threshold; (4) information indicating at least one time occasion in which interference was a maximum and/or a minimum; (5) information indicating at least one time occasion in which CQI and/or RI was a maximum and/or a minimum. For example, an indication (e.g., explicit indication) may be expressed in terms of any of a system frame number, a subframe index, a slot index, and/or a symbol index. The indication may reference a timing of a measurement report in pre-defined and/or configured time units or in terms of a number of periods for a measurement resource which may be configured periodically.

FIG. 6 is a flow diagram illustrating a representative beam management procedure 600 which may be implemented by a WTRU 102 102. As shown in FIG. 6, a WTRU 102 102 may receive (e.g., from a base station, such as a gNB 180) information indicating a configuration of a first set of reference signals (RSs) and a second set of RSs at 602. At 604, the WTRU 102 102 may proceed to determine a plurality of signal quality measurements for the RSs of the first set and the RSs of the second set. For example, the WTRU 102 102 may receive (e.g., by a base station) information indicating a measurement configuration which may be used by the WTRU 102 at 604. At 606, the WTRU 102 may determine a plurality of relative delay measurements for the RSs of the first set and the RSs of the second set. For example, the delay measurements may be made as described herein. At 608, the WTRU 102 may send (e.g., to a base station or the IRS 204) a report including information indicating a subset of the plurality of signal quality measurements which correspond to a first subset of the RSs of the first set and a second subset of the RSs of the second set (e.g., beam pairs) for which the respective signal quality measurements are greater than a first threshold and the relative delay measurements are less than a second threshold.

In certain representative embodiments, the reported first and second subsets of the RSs may represent beams selected according to beam selection mode (b) as described herein.

In certain representative embodiments, after sending the report, the WTRU 102 may receive (e.g., from a base station) information indicating a pair of RSs including one RS from the first subset and one RS from the second subset.

In certain representative embodiments, the WTRU 102 may receive (e.g., from a base station) information indicating a configuration of a RS for delay measurement. For example, the determining of the plurality of relative delay measurements for the RSs of the first set and the RSS of the second set (e.g., between the RSs of the first set and the RSs of the second set) at 606 may be made relative to the RS for delay measurement. For example, the determination of the plurality of relative delay measurements for the RSs of the first set and the RSs of the second set may include obtaining respective delay measurements of the RSs of the first set relative to the RS for delay measurement and obtaining respective delay measurements of the RSs of the second set relative to the RS for delay measurement. As an example, relative delay measurements between pairs of the RSs in the first set and the second set may be obtained using respective delay measurements of the RSs of the first set and the respective delay measurements of the RSs of the second set.

In some representative embodiments, the RS for delay measurement may be indicated as an RS from (e.g., included in) one of the first set of RSs or the second set of RSs. In some representative embodiments, the RS for delay measurement may be different from (e.g., not included in) the RSs of the first set of RSs and the second set of RSs.

In certain representative embodiments, the report sent at 608 may include information indicating identifiers of the first subset of RSs and identifiers of the second subset of RSs which are associated with the subset of signal quality measurements. For example, the identifiers may be resource indices, such as CRIs and/or SSBRIs as described herein.

In certain representative embodiments, the report sent at 608 may include information indicating a subset of the delay measurements (e.g., that are less than the second threshold) which are associated with the first subset of RSs and the second subset of RSs which are associated with the subset of signal quality measurements. For example, the report may include information indicating the first subset of RSs and the second subset of RSs in association with the subset of signal quality measurements (e.g., greater than the first threshold) and the subset of delay measurements (e.g., less than the second threshold).

In certain representative embodiments, the first set of RSs may be associated with a first set of beams transmitted (e.g., from the base station) directly to the WTRU 102.

In certain representative embodiments, the second set of RSs may be associated with a second set of beams transmitted (e.g., from the base station) indirectly to the WTRU 102 via a RIS 204.

In certain representative embodiments, the WTRU 102 may receive (e.g., from the base station) information indicating any of the first threshold and/or the second threshold.

In certain representative embodiments, the signal quality measurements may include any of a reference signal received power (RSRP), a reference signal received quality (RSRQ), a signal to interference and noise ratio (SINR), and/or a channel quality indicator (CQI).

In certain representative embodiments, the WTRU 102 may receive (e.g., from the base station) information indicating a number of RSs (e.g., beams) to be reported in each of the first subset and the second subset.

In certain representative embodiments, the report may include information indicating the first subset of the RSs and the second subset of the RSs as RS pairs which are respectively associated with the subset of the plurality of signal quality measurements.

In certain representative embodiments, the RSs of the first set of RSs and the second set of RSs may include any of channel state information RSs (CSI-RSs) and/or synchronization signal blocks (SSBs).

In certain representative embodiments, the WTRU 102 may receive control information (e.g., via RRC, MAC CE, DCI) indicating activation of the first set of RSs. After (e.g., a number of symbols, slots, or subframes after) the indicated activation of the first set of RSs, the WTRU 102 may receive the first set of RSs. The WTRU 102 may receive (e.g., via RRC, MAC CE, DCI) control information indicating activation of the second set of RSs. After the indicated activation of the second set of RSs, the WTRU 102 may receive the second set of RSs.

FIG. 7 is a flow diagram illustrating a representative transmission configuration indication (TCI) state and/or quasi co-located (QCL) relationship determination procedure 700 which may be implemented by a WTRU 102. As shown in FIG. 7, a WTRU 102 may receive information indicating a plurality of transmission configuration indication (TCI) states and/or quasi co-location (QCL) relationships at 702. After, the WTRU 102 may receive scheduling information for a first transmission at 704. For example, the scheduling information may indicate one or more first time resources associated with the first transmission. At 706, the WTRU 102 may send or receive the first transmission using the indicated time resources and one or more of the TCI states and/or QCL relationships which are associated with the indicated first time resources.

In certain representative embodiments, the plurality of TCI states and/or QCL relationships are associated with a plurality of reflection parameter sets of a RIS 204. For example, the first transmission may be sent by a base station (e.g., a gNB 180) and reflected by the RIS 204 which is configured with a reflection parameter set, among the plurality of reflection parameter sets, which is associated with the indicated first time resources. At the WTRU 102, the reflected first transmission may be received (e.g., using the indicated time resources and one or more of the TCI states and/or QCL relationships which are associated with the indicated first time resources).

In certain representative embodiments, the WTRU 102 may determine which of the plurality of TCI states and/or QCL relationships are associated with the indicated first time resources.

In certain representative embodiments, a plurality of time resources may include a first set of time resources and a second set of time resources. For example, the indicated first time resources may be included in the first set of time resources.

In certain representative embodiments, the plurality of TCI states and/or QCL relationships which are associated with the indicated first time resources are determined based on an association between the plurality of time resources and the plurality of TCI states and/or QCL relationships.

In certain representative embodiments, the WTRU 102 may receive scheduling information for a second transmission. For example, the scheduling information may indicate one or more second time resources (e.g., included in the second set of time resources) which are associated with the second transmission. The WTRU 102 may send or receive the second transmission using the indicated second time resources and one or more of the TCI states and/or QCL relationships which are associated with the indicated second time resources.

In certain representative embodiments, the one or more of the TCI states and/or QCL relationships may be associated with the indicated second time resources, and may include at least one TCI state and/or QCL relationship which is different than the one or more of the TCI states and/or QCL relationships which are associated with the indicated first time resources. For example, the second transmission may be sent by a base station (e.g., a gNB 180) and reflected by the RIS 204 which is configured with a (e.g., second) reflection parameter set, among the plurality of reflection parameter sets, which is associated with the indicated second time resources. At the WTRU 102, the reflected second transmission may be received (e.g., using different indicated time resources and one or more of the TCI states and/or QCL relationships which are associated with the indicated second time resources).

In certain representative embodiments, the scheduling information may be downlink control information (DCI) having a WTRU-specific format or a group-specific format.

In certain representative embodiments, the QCL relationships may be based on QCL types. For example, the QCL types may include any of a Doppler shift, a Doppler spread, an average delay, a delay spread, and/or a spatial reception parameter.

In certain representative embodiments, the first and/or second transmission may be any of a physical downlink shared channel (PDSCH) transmission, a physical downlink control channel (PDCCH) transmission, a physical uplink shared channel (PUSCH) transmission, and/or a physical uplink control channel (PUCCH) transmission.

Figures 8, 9:
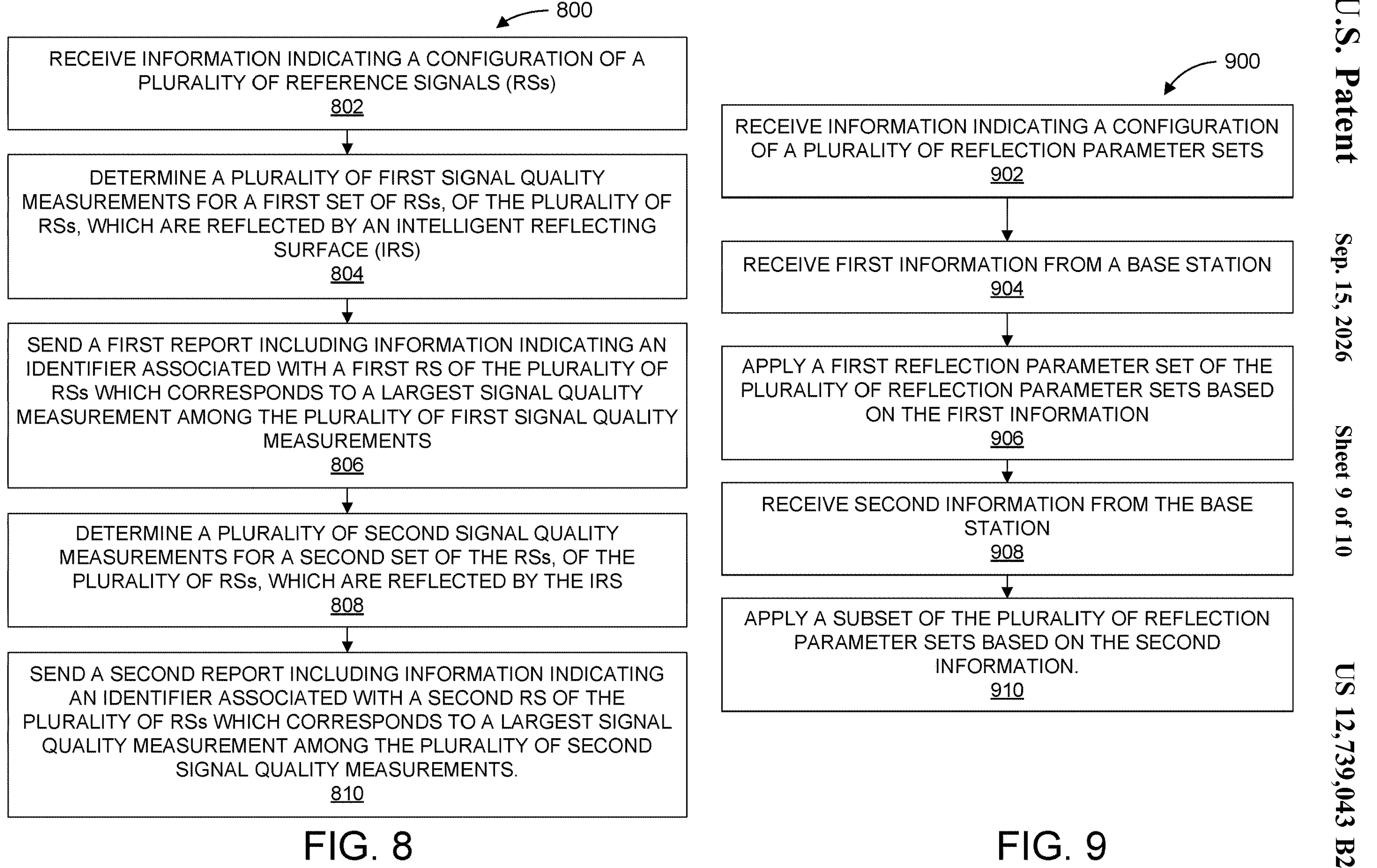
FIG. 8 is a flow diagram illustrating another representative beam management procedure which may be implemented by a WTRU.
FIG. 9 is a flow diagram illustrating a representative beam management procedure which may be implemented by a RIS.

FIG. 8 is a flow diagram illustrating another representative beam management procedure 800 which may be implemented by a WTRU 102. As shown in FIG. 8, a WTRU 102 may receive information indicating a configuration of a plurality of reference signals (RSS) at 802. At 804, the WTRU 102 may determine a plurality of first signal quality measurements for a first set of RSs, of the plurality of RSs. For example, the first set of RSs may be reflected by a RIS 204 (e.g., with a reflection parameter set). After 804, the WTRU may send, at 806, a first report (e.g., reporting) including (e.g., first) information indicating an identifier associated with a first RS of the plurality of RSs. For example, the first RS may correspond to a largest (or preferred) signal quality measurement among the plurality of first signal quality measurements. At 808, the WTRU **10*s* may determine a plurality of second signal quality measurements for a second set of the RSs of the plurality of RSs. For example, the second set of RSs may be reflected by the RIS 204 (e.g., with different reflection parameter sets applied). After 808, the WTRU 102 may send, at 810**, a second report (e.g., reporting) including information indicating an identifier associated with a second RS of the plurality of RSs. For example, the second RS may correspond to a largest (or preferred) signal quality measurement among the plurality of second signal quality measurements.

In certain representative embodiments, the WTRU 102 may receive the first set of RSs which are reflected by the RIS 204 which is configured with a first reflection parameter set.

In certain representative embodiments, the WTRU 102 may receive the second set of RSs which are reflected by the RIS 204 which is configured with a plurality of second reflection parameter sets. For example, the RIS 204 may respectively apply the second reflection parameter sets in accordance with the transmission of the RSs of the second set.

In certain representative embodiments, the WTRU 102 may receive information indicating to activate the first set of RSs prior to determining the plurality of first signal quality measurements.

In certain representative embodiments, the WTRU 102 may receive information indicating to activate the second set of RSs prior to determining the plurality of second signal quality measurements.

In certain representative embodiments, the identifier associated with the first RS may be any of a channel state information RS resource indicator (CRI) and/or a synchronization signal/physical broadcast channel block resource indicator (SSBRI).

In certain representative embodiments, the identifier associated with the first RS may be any of a channel state information RS resource indicator (CRI) and/or a synchronization signal/physical broadcast channel block resource indicator (SSBRI).

In certain representative embodiments, the WTRU 102 may send the first report and/or the second report to a base station.

In certain representative embodiments, the WTRU 102 may send the first report and/or the second report to the RIS 204.

In certain representative embodiments, the first signal quality measurements and/or the second signal quality measurements are any of a reference signal received power (RSRP), a reference signal received quality (RSRQ), a signal to interference and noise ratio (SINR), and/or a channel quality indicator (CQI).

In certain representative embodiments, any of the RSs of the first set of RSs and/or the second set of RSs may be repeatedly transmitted by a base station.

FIG. 9 is a flow diagram illustrating a representative beam management procedure 900 which may be implemented by a RIS 204. As shown in FIG. 9, a RIS 204 may receive information indicating a configuration of a plurality of reflection parameter sets at 902. At 904, the RIS 204 may receive first information from a base station. For example, the first information may include information indicating activation of a reflection parameter set and/or information scheduling transmission of one or more RSs. At 906, the RIS 204 may apply a first reflection parameter set of the plurality of reflection parameter sets based on the first information. For example, the RIS 204 may reflect a plurality of transmissions from the base station (e.g., to a WTRU 102) after 906. At 908, the RIS 204 may receive second information from the base station. For example, the second information may include information indicating activation of a plurality of reflection parameter sets and/or information scheduling transmission of one or more RSs. At 910, the RIS 204 may apply a subset of the plurality of reflection parameter sets based on the second information. For example, the RIS 204 may reflect a plurality of transmissions from the base station (e.g., to a WTRU 102) after 910.

Figure 10:
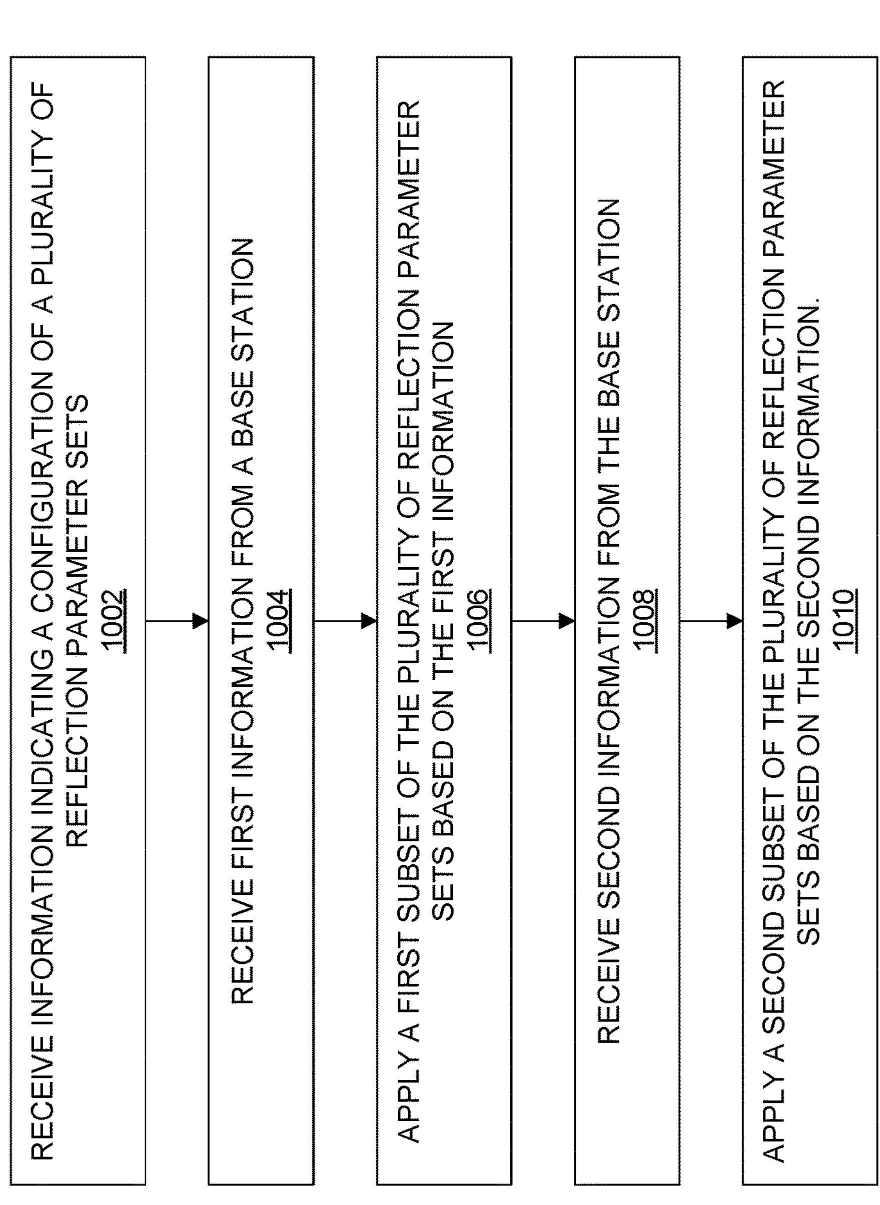
FIG. 10 is a flow diagram illustrating another representative beam management procedure which may be implemented by a RIS.

FIG. 10 is a flow diagram illustrating another representative beam management procedure 1000 which may be implemented by a RIS 204. As shown in FIG. 10, a RIS 204 may receive information indicating a configuration of a plurality of reflection parameter sets at 1002. At 1004, the RIS 204 may receive first information from a base station. For example, the first information may include information indicating activation of a first subset of the reflection parameter sets and/or information scheduling transmission of one or more RSs. At 1006, the RIS 204 may apply (e.g., sequentially) the first subset of the plurality of reflection parameter sets based on the first information. For example, the RIS 204 may reflect a plurality of transmissions from the base station (e.g., to a WTRU 102) using the first subset. At 1008, the RIS 204 may receive second information from the base station. For example, the second information may include information indicating activation of a second subset of the plurality of reflection parameter sets and/or information scheduling transmission of one or more RSs. At 1010, the RIS 204 may apply (e.g., sequentially) the second subset of the plurality of reflection parameter sets based on the second information. For example, the RIS 204 may reflect a plurality of transmissions from the base station (e.g., to a WTRU 102) using the second subset.

In certain representative embodiments, a WTRU 102 may implement a method which includes receiving information indicating a plurality of reflection modes of an intelligent reflecting surface (IRS). The WTRU 102 may proceed to measure respective signal qualities of a first set of transmissions of a plurality of beams transmitted from a base station according to the measurement configuration. The WTRU 102 may send information indicating at least one beam among the plurality of measured beams. The WTRU 102 may proceed to measure respective signal qualities of a second set of transmissions of the at least one indicated beam associated with the plurality of reflection modes according to the measurement configuration. The WTRU 102 may send information indicating at least one reflection mode among the plurality of reflection modes.

For example, the reception of the information indicating the measurement configuration may include to receive information indicating a first measurement configuration associated with the measuring of the respective signal qualities of the first set of transmissions, and to receive information indicating a second measurement configuration associated with the measuring of the respective signal qualities of the second set of transmissions.

For example, the first set of transmissions of the plurality of beams may include one or more reference signals and/or the second set of transmissions of the at least one indicated beam may include one or more reference signals.

For example, the information indicating at least one beam among the plurality of measured beams may be a reference signal index and/or a reflection mode index.

For example, the WTRU 102 may receive information indicating a configuration of the plurality of beams to be transmitted from the base station. As an example, the configuration may be a mapping of the plurality of beams.

For example, the WTRU 102 may determine a configuration of the plurality of beams to be transmitted from the base station based on the measurement configuration.

In certain representative embodiments, a WTRU 102 may implement a method which includes receiving information indicating a configuration of a first set of reference signals associated with transmission from a base station and a second set of reference signals associated with reflection from an intelligent reflecting surface (IRS). The WTRU 102 may proceed to measure respective signal qualities of the first set of reference signals and the second set of reference signals. The WTRU 102 may measure respective delay amounts of the first set of reference signals and the second set of reference signals. The WTRU 102 may proceed to send information indicating one or more first reference signals among the first set of reference signals and one or more second reference signals among the second set of reference signals according to the respective signal qualities and the respective delay amounts. The WTRU 102 may receive information indicating a pair of one of the first reference signals and one of the second reference signals.

For example, the reception of the information indicating the configuration of the first set of reference signals and the second set of reference signals may include to receive information indicating a configuration of a reference signal for use as reference in measuring the respective delay amounts that is different than the first set of reference signals and/or the second set of reference signals.

For example, the measuring of the respective delay amounts of the first set of reference signals and the second set of reference signals may use one of the reference signals among the first set and/or the second set of reference signals as a reference in measuring the respective delay amounts.

For example, the one or more first reference signals among the first set of reference signals and the one or more second reference signals among the second set of reference signals may correspond to the respective signal qualities which are greater than or equal to a signal quality threshold and correspond to the respective delay amounts which are less than or equal to a delay amount threshold.

In certain representative embodiments, a WTRU 102 may implement a method which includes receiving information indicating a configuration of a set of first reference signals associated with reflection from an intelligent reflecting surface (IRS). The WTRU 102 may measure respective signal qualities of the set of first reference signals. The WTRU 102 may measure respective delay amounts of the set of first reference signals. After, the WTRU 102 may send information indicating one or more first reference signals among the set of first reference signals according to the respective signal qualities and the respective delay amounts. The WTRU 102 may receive information indicating a pair of one of the first reference signals and a second reference signal.

For example, the reception of the information indicating the configuration of the set of first reference signals further may include receiving information indicating a configuration of a reference signal different than the set of first reference signals for use as reference in measuring the respective delay amounts.

For example, the measuring of the respective delay amounts of the set of first reference signals may use one of the first reference signals as a reference in measuring the respective delay amounts.

For example, the one or more first reference signals may correspond to the respective signal qualities which are greater than or equal to a signal quality threshold and correspond to the respective delay amounts which are less than or equal to a delay amount threshold.

In certain representative embodiments, a WTRU 102 may implement a method which includes determining that transmission spatial filter repeating at a base station is deactivated. The WTRU 102 may determine that reflection mode sweeping at an intelligent reflecting surface (IRS) is activated. The WTRU 102 may measure respective signal qualities of a plurality of transmissions of a reference signal resource transmitted from the base station which are associated with a plurality of transmission spatial filters used at the base station and which are associated with reflection mode sweeping of a plurality of reflection modes applied at the IRS. The WTRU 102 may report information indicating at least one of the plurality of the transmission spatial filters, at least one of the plurality of reflection modes and/or at least one of the measured respective signal qualities corresponding thereto.

In certain representative embodiments, a WTRU 102 may implement a method which includes determining that transmission spatial filter repeating at a base station is activated. The WTRU 102 may determine that reflection mode sweeping at an intelligent reflecting surface (IRS) is activated. The WTRU 102 may measure respective signal qualities of a plurality of transmissions of a reference signal resource transmitted from the base station which are associated with a same transmission spatial filter at the base station and which are associated with reflection mode sweeping of a plurality of reflection modes applied at the IRS. The WTRU 102 may report information indicating at least one of the plurality of reflection modes and/or at least one of the measured respective signal qualities corresponding thereto.

In certain representative embodiments, a WTRU 102 may implement a method which includes determining that transmission spatial filter repeating at a base station is deactivated. The WTRU 102 may determine that reflection mode sweeping at an intelligent reflecting surface (IRS) is deactivated. The WTRU 102 may measure respective signal qualities of a plurality of transmissions of a reference signal resource transmitted from the base station which are associated with a plurality of transmission spatial filters used at the base station and which are associated with a same reflection mode applied at the IRS. The WTRU 102 may report information indicating at least one of the plurality of transmission spatial filters and/or at least one of the measured respective signal qualities corresponding thereto.

For example, the measuring of the respective signal qualities of the plurality of transmissions of the reference signal resource may use a plurality of reception spatial filters at the WTRU.

For example, the WTRU 102 may report information indicating at least one of the plurality of reception spatial filters corresponding to the reported at least one of the measured respective signal qualities.

In certain representative embodiments, a WTRU 102 may implement a method which includes determining that transmission spatial filter repeating at a base station is activated. The WTRU 102 may determine that reflection mode sweeping at an intelligent reflecting surface (IRS) is deactivated. The WTRU 102 may measure respective signal qualities of a plurality of transmissions of a reference signal resource using a plurality of reception spatial filters at the WTRU. The reference signal resource may be used for a transmission from the base station with a same transmission spatial filter at the base station and with a same reflection mode applied at the IRS. The WTRU 102 may report information indicating at least one of the plurality of reception spatial filters and/or at least one of the measured respective signal qualities corresponding thereto.

For example, the respective types of the measured signal quantities are associated with respective reflection modes applied at the IRS.

In certain representative embodiments, a WTRU 102 may implement a method which includes receiving information indicating a time domain pattern of a plurality of time resources. The WTRU 102 may receive information indicating a configuration of one or more transmission configuration indicator (TCI) states which are each associated with one or more reference signals (RSS). The WTRU 102 may determine respective quasi co-located (QCL) relationships for first and second sets of time resources among the plurality of time resources according to which of the one or more RSs are transmitted in each of the first and second sets of time resources. The WTRU 102 may send or receive a first transmission in the first set of time resources using the determined QCL relationship for the first set of time resources. The WTRU 102 may send or receive a second transmission in the second set of time resources using the determined QCL relationship for the second set of time resources.

For example, the time domain pattern may be associated with one or more reflection modes to be applied at an intelligent reflecting surface (IRS). For example, the first transmission and/or the second transmission may include a reference signal. For example, the first transmission and/or the second transmission is a physical channel transmission.

In certain representative embodiments, a base station may be configured to communicate with a WTRU as described herein. In certain representative embodiments, an IRS or RIS may be configured to communicate with a WTRU and/or base station as described herein.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

What is claimed is:

1. A method implemented by a wireless transmit/receive unit (WTRU), the method comprising:

receiving information indicating a configuration of a first set of reference signals (RSs) and a second set of RSs, wherein the first set of RSs is different than the second set of RSs;

determining a plurality of signal quality measurements for the RSs of the first set and for the RSs of the second set;

determining a plurality of relative delay measurements for the RSs of the first set and for the RSs of the second set; and sending a report including information indicating a subset of the plurality of signal quality measurements which correspond to a first subset of the RSs of the first set and a second subset of the RSs of the second set, wherein the report includes information associating the first subset of RSs with the second subset of RSs as one or more pairs of RSs, and wherein the respective signal quality measurements are greater than a first threshold and the relative delay measurements are less than a second threshold for each pair.

2. The method of claim 1, further comprising:

after sending the report, receiving information indicating a pair of RSs including one RS from the first subset and one RS from the second subset.

3. The method of claim 1, further comprising:

receiving information indicating a configuration of a RS for delay measurement, wherein the determining of the plurality of relative delay measurements for the RSs of the first set and for the RSs of the second set includes obtaining respective delay measurements of the RSs of the first set relative to the RS for delay measurement and obtaining respective delay measurements of the RSs of the second set relative to the RS for delay measurement.

4. The method of claim 3, wherein the RS for delay measurement is an RS from one of the first set of RSs or the second set of RSs.

5. The method of claim 3, wherein the RS for delay measurement is different from the RSs of the first set of RSs and the second set of RSs.

6. The method of claim 1, wherein the report includes information indicating RS identifiers of the first subset of RSs and RS identifiers of the second subset of RSs which are associated with the subset of signal quality measurements.

7. The method of claim 1, wherein the first set of RSs are associated with a first set of beams transmitted directly to the WTRU.

8. The method of claim 7, wherein the second set of RSs are associated with a second set of beams transmitted indirectly to the WTRU via an intelligent reflecting surface (IRS).

9. The method of claim 1, wherein the signal quality measurements include any of a reference signal received power (RSRP), a reference signal received quality (RSRQ), a signal to interference and noise ratio (SINR), and/or a channel quality indicator (CQI).

10. The method of claim 1, wherein the RSs of the first set of RSs and the second set of RSs are any of channel state information RSs (CSI-RSs) and/or synchronization signal blocks (SSBs).

11. A wireless transmit/receive unit (WTRU) comprising:

a processor, memory, and a transceiver which are configured to:

receive information indicating a configuration of a first set of reference signals (RSs) and a second set of RSs, wherein the first set of RSs is different than the second set of RSs, determine a plurality of signal quality measurements for the RSs of the first set and for the RSs of the second set, determine a plurality of relative delay measurements for the RSs of the first set and for the RSs of the second set, and send a report including information indicating a subset of the plurality of signal quality measurements which correspond to a first subset of the RSs of the first set and a second subset of the RSs of the second set, wherein the report includes information associating the first subset of RSs with the second subset of RSs as one or more pairs of RSs, and wherein the respective signal quality measurements are greater than a first threshold and the relative delay measurements are less than a second threshold for each pair.

12. The WTRU of claim 11, wherein the processor, memory, and the transceiver are configured to:

after sending the report, receive information indicating a pair of RSs including one RS from the first subset and one RS from the second subset.

13. The WTRU of claim 11, wherein the processor, memory, and the transceiver are configured to:

receive information indicating a configuration of a RS for delay measurement, wherein the determination of the plurality of relative delay measurements for the RSs of the first set and for the RSs of the second set includes to obtain respective delay measurements of the RSs of the first set relative to the RS for delay measurement and to obtain respective delay measurements of the RSs of the second set relative to the RS for delay measurement.

14. The WTRU of claim 13, wherein the RS for delay measurement is an RS from one of the first set of RSs or the second set of RSs.

15. The WTRU of claim 13, wherein the RS for delay measurement is different from the RSs of the first set of RSs and the second set of RSs.

16. The WTRU of claim 11, wherein the report includes information indicating RS identifiers of the first subset of RSs and RS identifiers of the second subset of RSs which are associated with the subset of signal quality measurements.

17. The WTRU of claim 11, wherein the first set of RSs are associated with a first set of beams transmitted directly to the WTRU.

18. The WTRU of claim 11, wherein the second set of RSs are associated with a second set of beams transmitted indirectly to the WTRU via an intelligent reflecting surface (IRS).

19. The WTRU of claim 11, wherein the signal quality measurements include any of a reference signal received power (RSRP), a reference signal received quality (RSRQ), a signal to interference and noise ratio (SINR), and/or a channel quality indicator (CQI).

20. The WTRU of claim 11, wherein the RSs of the first set of RSs and the second set of RSs are any of channel state information RSs (CSI-RSs) and/or synchronization signal blocks (SSBs).

* * * * *